(12) United States Patent
Sakai et al.

(10) Patent No.: US 6,312,357 B1
(45) Date of Patent: Nov. 6, 2001

(54) SPEED RATIO CONTROLLER AND CONTROL METHOD OF NON-FINITE SPEED RATIO TRANSMISSION DEVICE

(75) Inventors: Hiromasa Sakai, Yokosuka; Motoharu Nishio, Yokohama; Hiroaki Kuramoto, Yokosuka, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/460,503

(22) Filed: Dec. 14, 1999

(30) Foreign Application Priority Data

Dec. 15, 1998 (JP) .................................................. 10-356277

(51) Int. Cl.⁷ ..................................................... B60K 41/12
(52) U.S. Cl. ................................................................ 477/37
(58) Field of Search ............................... 477/37, 43, 159, 477/160; 475/216; 476/2; 74/110

(56) References Cited

U.S. PATENT DOCUMENTS

| | | | |
|---|---|---|---|
| 4,735,113 | * | 4/1988 | Yamamuro et al. ............ 477/38 |
| 5,888,160 | * | 3/1999 | Miyata et al. .................. 475/216 |
| 5,935,039 | * | 8/1999 | Sakai et al. ..................... 477/37 X |
| 5,971,887 | * | 10/1999 | Hattori et al. .................. 477/48 X |
| 6,080,079 | * | 6/2000 | Sakai ............................... 477/37 X |
| 6,146,308 | * | 11/2000 | Taniguchi et al. .............. 477/48 |
| 6,155,951 | * | 12/2000 | Kuhn et al. ..................... 475/216 |
| 6,168,547 | * | 1/2001 | Kawamura ...................... 477/160 X |
| 6,171,210 | * | 1/2001 | Miyata et al. .................. 475/216 |
| 6,174,261 | * | 1/2001 | Watanabe et al. .............. 477/43 |

FOREIGN PATENT DOCUMENTS

| | | |
|---|---|---|
| 61-105347 | 5/1986 | (JP) . |
| 8-338492 | 12/1996 | (JP) . |
| 9-89071 | 3/1997 | (JP) . |
| 10-267117 | 10/1998 | (JP) . |

* cited by examiner

Primary Examiner—Rodney H. Bonck
Assistant Examiner—Roger Pang
(74) Attorney, Agent, or Firm—Foley & Lardner

(57) ABSTRACT

A creep torque is controlled in a non-finite speed ratio transmission device, wherein a planetary gear unit (5) varies a rotation direction of a final output shaft (6) according to a relative rotation of a toroidal continuously variable transmission (2) and fixed speed ratio transmission (3). The controller comprises a hydraulic cylinder (39) which varies the speed ratio of the toroidal continuously variable transmission (2) by driving a trunnion (23), a shift control valve (46) which supplies a hydraulic pressure to the hydraulic cylinder (30) according to a displacement position, a step motor (36) which displaces the shift control valve (46) according to a command signal, and a mechanical feedback member (35, 37, 38) which feeds back the speed ratio of the toroidal continuously variable transmission (2) to the shift control valve (46). The controller further comprises a sensor (83, 86) which detects a running state of a vehicle, a sensor (81, 82) which detects the real speed ratio of the continuously variable transmission (2), and a microprocessor (80) which outputs the command signal. When the vehicle running state corresponds to a predetermined state, the microprocessor (80) outputs a new command signal based on a required creep torque and the real speed ratio of the continuously variable transmission (2) to the step motor (36).

10 Claims, 18 Drawing Sheets

SPEED RATIO CONTROLLER AND CONTROL METHOD OF NON-FINITE SPEED RATIO TRANSMISSION DEVICE

FIELD OF THE INVENTION

This invention relates to control of a non-finite speed ratio transmission device for vehicles using a toroidal continuously variable transmission.

BACKGROUND OF THE INVENTION

U.S. Pat. No. 5,935,039 discloses a non-finite speed ratio transmission device which combines a toroidal continuously variable transmission, a fixed speed ratio transmission and a planetary gear unit in order to obtain a speed ratio range larger than the toroidal continuously variable transmission. Tokkai Hei 10-267117 published by the Japanese Patent Office in 1997 discloses a controller which controls the creep torque applied to a drive wheel at low vehicle speed according to the operating state of the brake in such an non-finite speed ratio transmission device.

This controller assigns a step number obtained by subtracting or adding a fixed amount from a step number corresponding to a geared neutral position GNP to a step motor, and increases or decreases a difference of oil pressure acting on a trunnion from two directions using a relief valve.

The geared neutral position GNP is a rotating position of the step motor at which the output rotation speed of the non-finite speed ratio transmission device becomes zero.

SUMMARY OF THE INVENTION

The response characteristics of oil pressure control generally decline when the temperature of the oil transmitting the oil pressure decreases.

As a result, the precision with which this controller controls creep torque is low at low temperatures.

It is therefore an object of this invention to increase the precision of creep torque control at low temperatures of a non-finite speed ratio transmission device.

In order to achieve the above object, this invention provides a speed ratio controller for use with a non-finite speed ratio transmission device of a vehicle. The transmission device comprises a toroidal continuously variable transmission which causes a speed ratio to vary according to a gyration angle variation of a power roller gripped between an input disk and output disk. The power roller vares the gyration angle according to a displacement of a supporting member which supports the power roller. The transmission device further comprises a fixed speed ratio transmission which varies a rotation speed of the input disk with a fixed speed ratio, and a planetary gear unit which varies a rotation direction of a final output shaft according to a relation between a rotation output speed of the toroidal continuously variable transmission and a rotation output speed of the fixed speed ratio transmission.

The speed ratio controller comprises a hydraulic cylinder which displaces the supporting member according to a supplied hydraulic pressure, a control valve which supplies a hydraulic pressure to the hydraulic cylinder according to a displacement position thereof, an actuator which displaces the control valve according to a command signal, a feedback member which connects the supporting member and control valve and feeds back the displacement of the supporting member to the control valve by causing the control valve to displace in the reverse direction to the displacement direction due to the actuator, a sensor which detects a running state of the vehicle, a sensor which detects the speed ratio of the toroidal continuously variable transmission, and a microprocessor. The microprocessor is programmed to determine whether or not the vehicle running state corresponds to a predetermined state, calculate a new command signal based on a predetermined creep torque and the speed ratio of the toroidal continuously variable transmission when the vehicle running state corresponds to the predetermined state, and output the new command signal to the actuator.

This invention also provides a method for controlling a speed ratio of a non-finite speed ratio transmission device of a vehicle. The transmission device comprises a toroidal continuously variable transmission which causes a speed ratio to vary according to a gyration angle variation of a power roller gripped between an input disk and output disk, the power roller varying the gyration angle according to a displacement of a supporting member which supports the power roller, a hydraulic cylinder which displaces the supporting member according to a supplied hydraulic pressure, a control valve which supplies a hydraulic pressure to the hydraulic cylinder according to a displacement position thereof, an actuator which displaces the control valve according to a command signal, a feedback member which connects the supporting member and control valve and feeds back the displacement of the supporting member to the control valve by causing the control valve to displace in the reverse direction to the displacement direction due to the actuator, a fixed speed ratio transmission which varies a rotation speed of the input disk with a fixed speed ratio, and a planetary gear unit which varies a rotation direction of a final output shaft according to a relation between a rotation output speed of the toroidal continuously variable transmission and a rotation output speed of the fixed speed ratio transmission.

The method comprises detecting a running state of the vehicle, detecting the speed ratio of the toroidal continuously variable transmission, determining whether or not the vehicle running state corresponds to a predetermined state, calculating a new command signal based on a predetermined creep torque and the speed ratio of the toroidal continuously variable transmission when the vehicle running state corresponds to the predetermined state, and outputting the new command signal to the actuator.

The details as well as other features and advantages of this invention are set forth in the remainder of the specification and are shown in the accompanying drawings.

DESCRIPTION OF THE PREFERRED EMBODIMENTS

Figure 1:
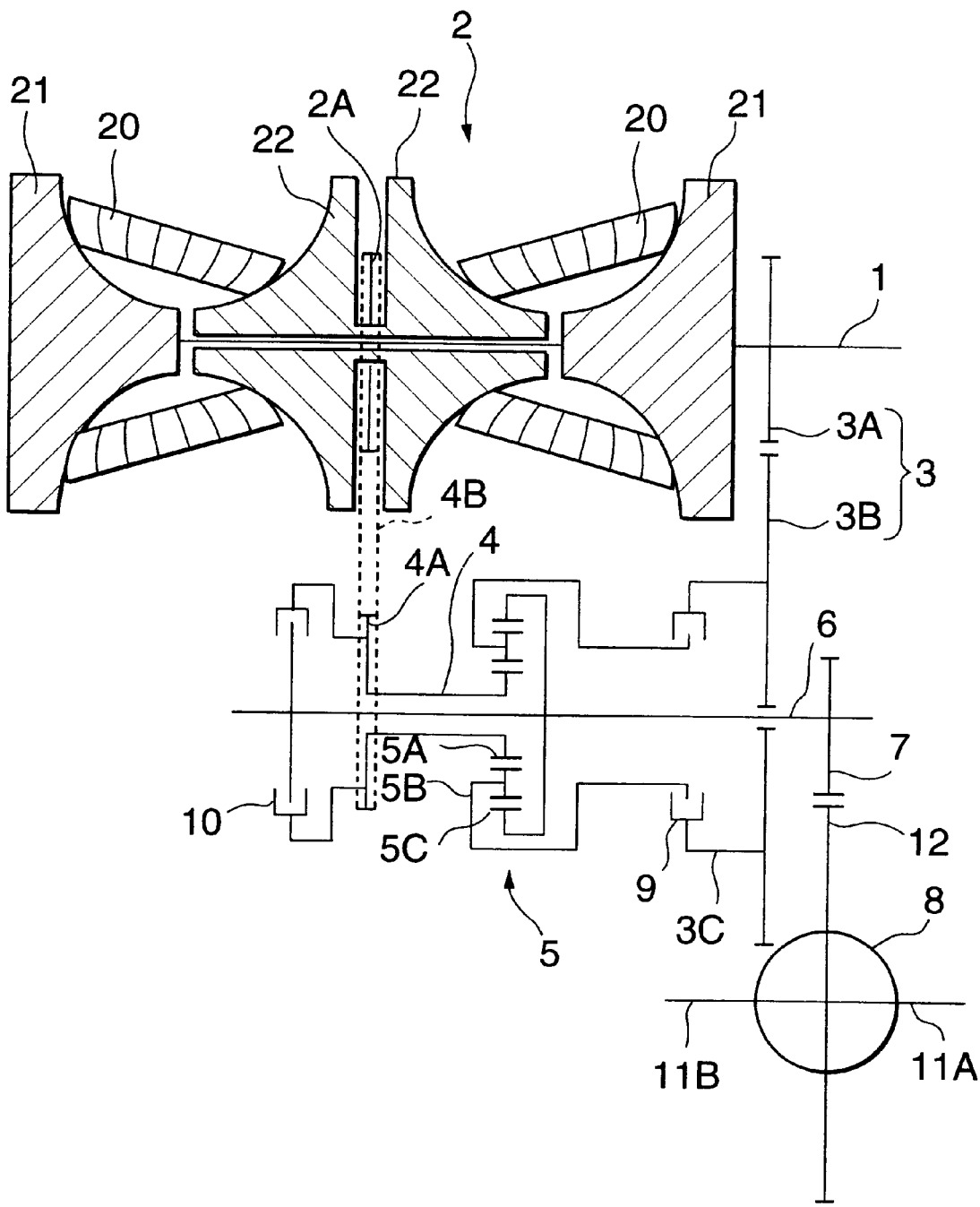
FIG. 1 is a schematic diagram of a non-finite speed ratio transmission device to which this invention is applied.
Figure 2:
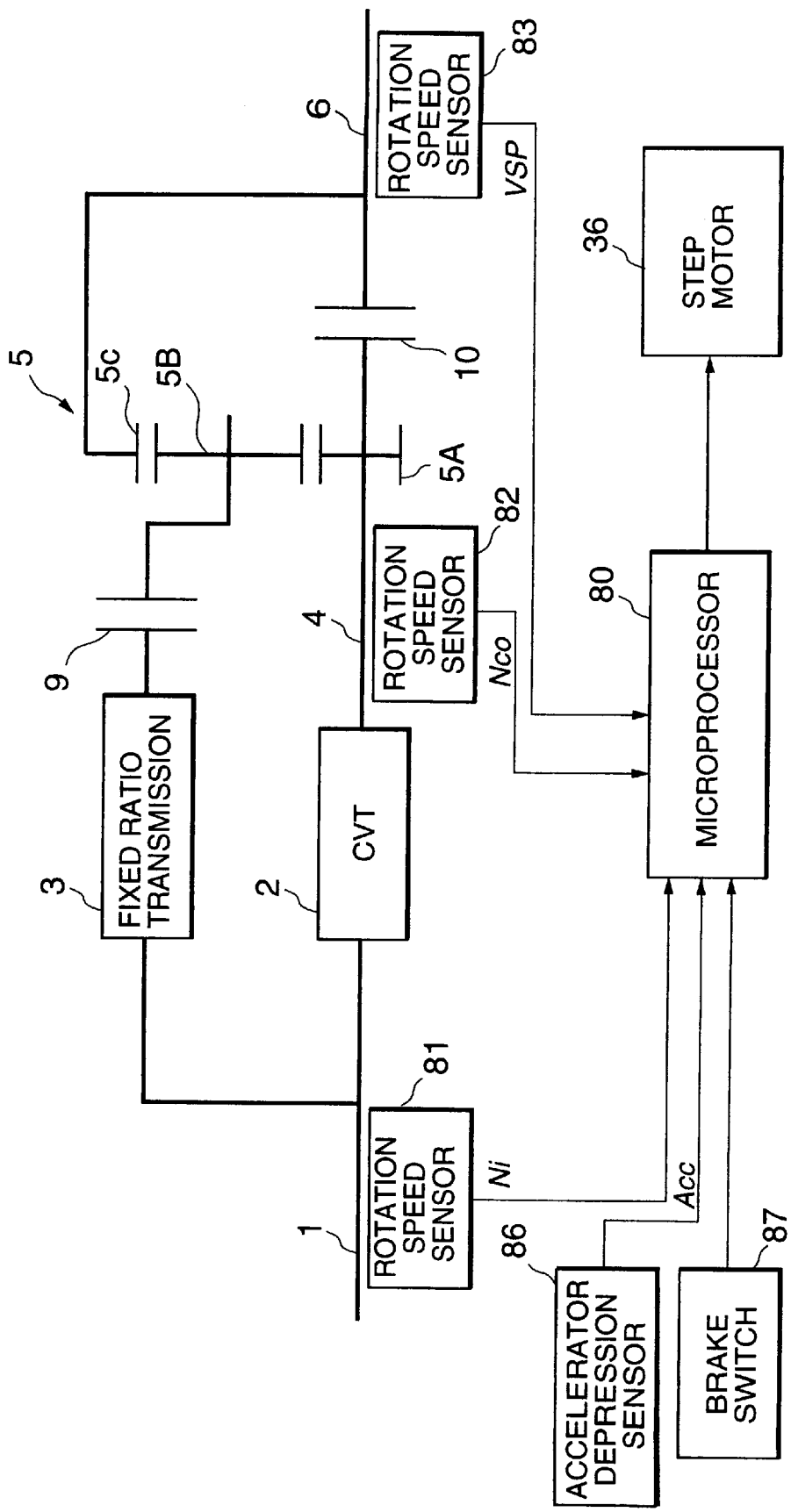
FIG. 2 is a schematic diagram of a speed ratio controller according to this invention.

Referring to FIG. 1 of the drawings, a non-finite speed ratio transmission device for a vehicle comprises an input shaft 1, toroidal continuously variable transmission (abbreviated hereafter as CVT) 2, reduction gear unit 3 as a fixed speed ratio transmission, planetary gear unit 5 and final output shaft 6.

The CVT 2 is provided with two toroidal units. Each toroidal unit comprises an input disk 21, an output disk 22 and a pair of power rollers 20 gripped therebetween. The input disks 1 are joined to the input shaft 1, and the input shaft 1 is joined to the output shaft of an engine of the vehicle, not shown. The rotation of the output disks 22 is transmitted to a CVT output shaft 4 via a sprocket 2A, chain 40 and sprocket 4A.

Figure 3:
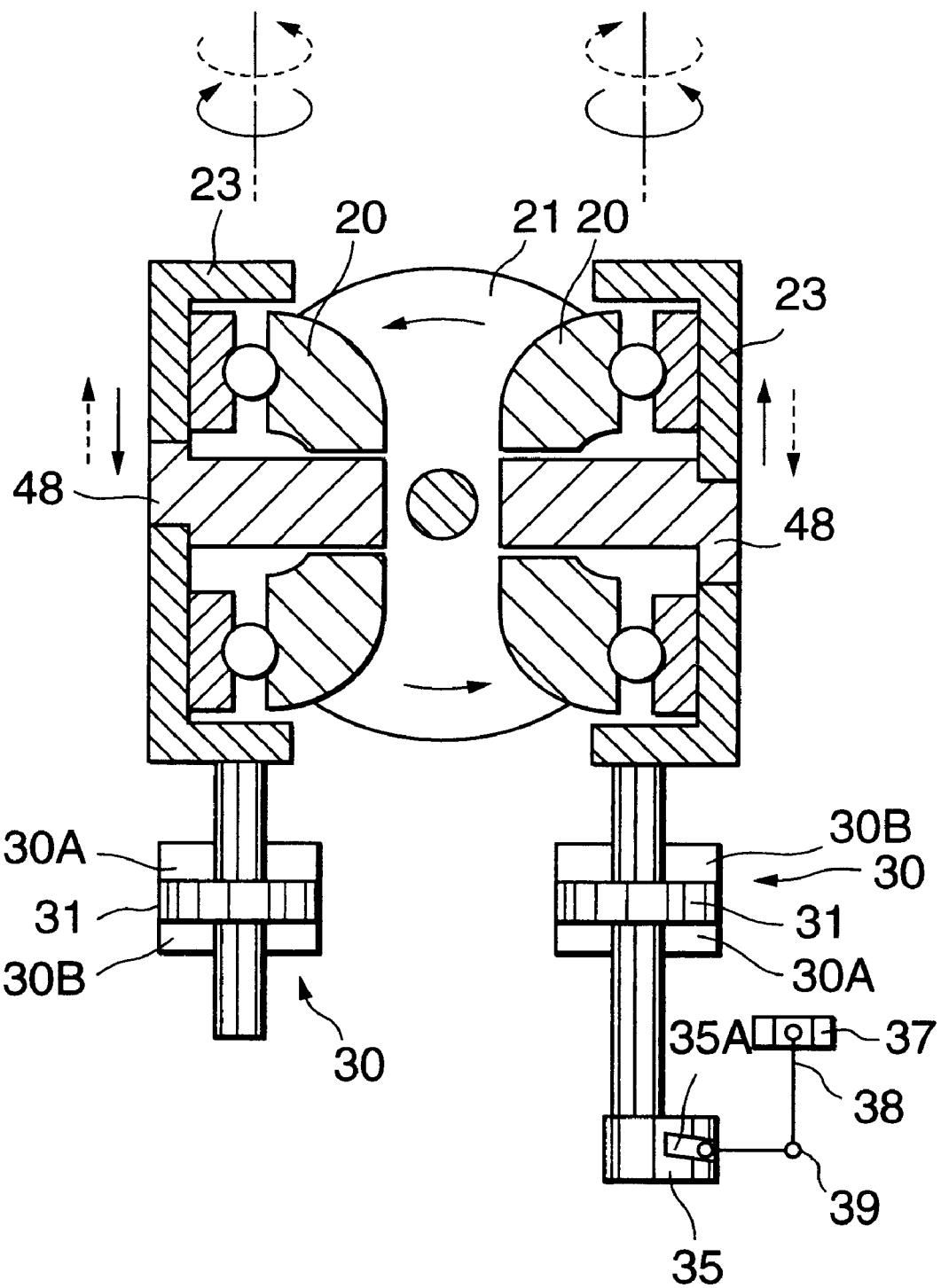
FIG. 3 is a schematic diagram of a toroidal continuously variable transmission, being a part of the non-finite speed ratio transmission device.

Referring to FIG. 3, the power roller 20 is supported by a trunnion 23. The trunnion 23 is driven in the up/down direction of the figure by a hydraulic cylinder 30.

The hydraulic cylinder 30 comprises a piston 31 fixed to the trunnion 23, and oil chambers 30A, 30B formed above and below the piston 31. The trunnion 23 displaces in an axial direction according to the differential pressure of the oil chambers 30A, 30B, and varies the contact position between the power roller 20, input disk 21 and output disk 22. This changes the balance of forces around the axis of the trunnion 23 exerted by these disks on the power roller 20, and the power roller 20 performs a rotational displacement together with the trunnion 23 around the axis of the trunnion 23. This is referred to as gyration angle variation of the power roller 20.

When a variation of the gyration angle of the power rollers 20 occurs, the rotation ratio between the input disk 21 and the output disk 22, i.e., the speed ratio, varies accordingly.

The oil chamber 30A of one of the trunnions 23 is disposed above the piston 31, and the oil chamber 30A of the other trunnion 23 is provided underneath the piston 31. Similarly, the oil chamber 30B of one of the trunnions 23 is disposed above the piston 31, and the oil chamber 30B of the other trunnion 23 is provided underneath the piston 31. The same oil pressure is supplied to both of the oil chambers 30A, and the same oil pressure is supplied to both of the oil chambers 30B. Due to this arrangement of the oil chambers 30A, 30B, the two trunnions 23 are driven in mutually opposite directions.

The CVT 2 altogether comprises four of the trunnions 23, but as shown in

FIG. 3, a precess cam 35 is attached to one of them. The oil pressure of the oil chambers 30A, 30B is supplied from a shift control valve 46 shown in FIG. 4. The precess cam 35 feeds back the rotation angle of the trunnion 23, i.e., a gyration angle ø of the power roller 20 and the axial displacement of the trunnion 23 to the control valve.

A cam groove 35A inclined in a circumferential direction is formed on the outer circumference of the precess cam 35, and one end of an L-shaped feedback link 38 engages with the cam groove 35A.

The feedback link 38 is supported free to pivot on a pivot shaft 39, one end being engaged with the cam groove 35A and the other end being connected with one end of a speed change link 37.

Figure 4:
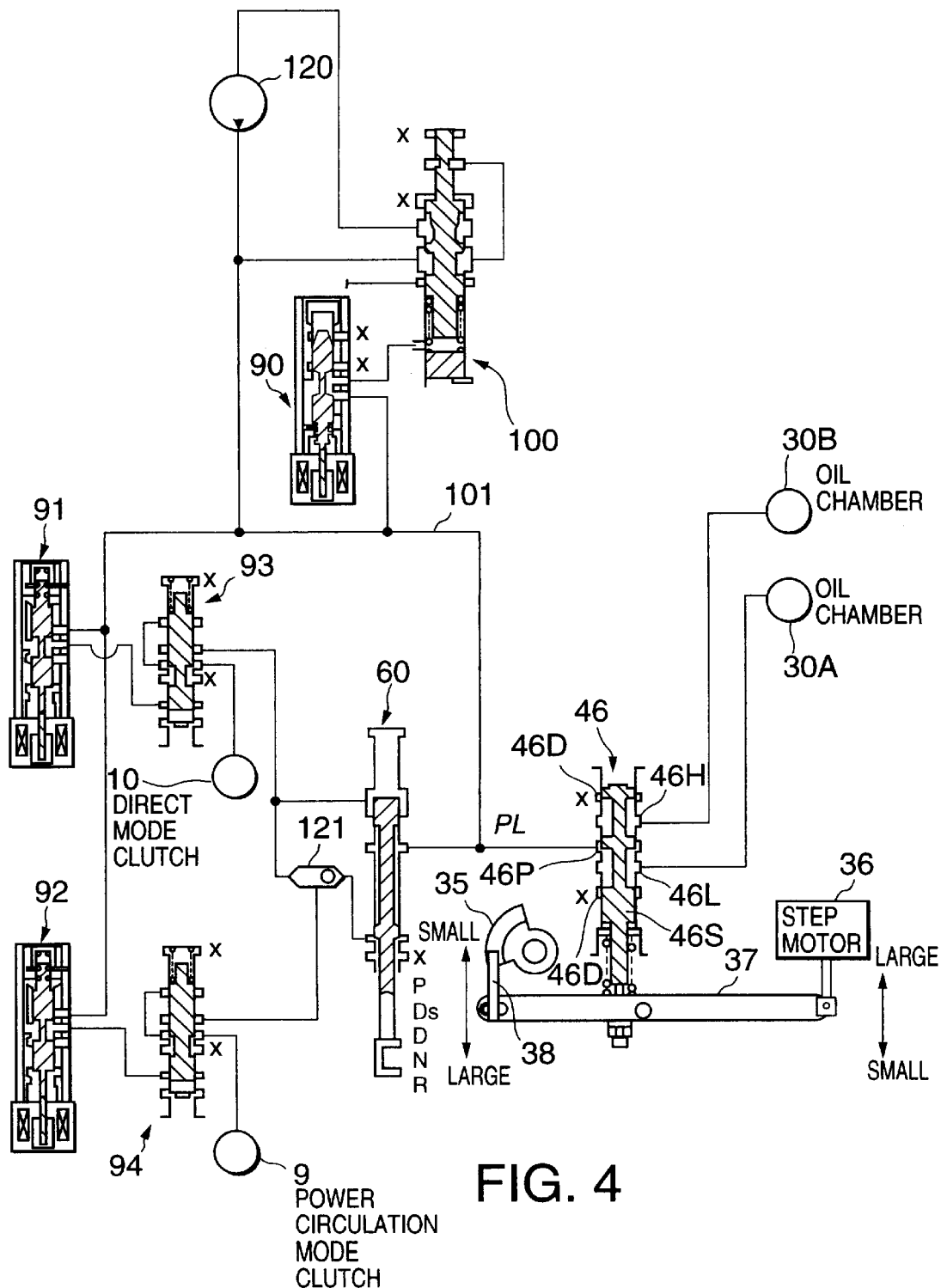
FIG. 4 is a diagram of an oil pressure circuit of the non-finite speed ratio transmission device.

Referring to FIG. 4, the middle part of a speed change link 37 is connected to the edge of a spool 46S of the shift control valve 46, and the other end of the speed change link 37 located on the opposite side of the connecting part with the feedback link 38 is connected to a step motor 36. Due to this arrangement, the speed change link 37 displaces the spool 46S in an axial direction according to the drive of the step motor 36.

The displacement of the spool 46S causes the rotational displacement and the axial displacement of the trunnion 23. The precess cam 35, feedback link 38 and speed change link 37 feed back these displacements to the spool 46S by displacing the spool 46S in the opposite direction.

Consequently, the spool 46S is maintained in a position wherein the displacement of the step motor 36 and the precess cam 35 are balanced. The precess cam 35, speed change link 37 and feedback link 38 are arranged to return the spool 46S to a neutral position when the CVT 2 reaches a speed ratio corresponding to the step number of the step motor 36. The meaning of neutral position in this context is a position wherein inflow and outflow of oil to and from the oil chambers 30A and 30B is blocked. In the following description, the precess cam 35, feedback link 38 and speed change link 37 are referred to as mechanical feedback members.

Referring again to FIG. 1, the CVT output shaft 4 is joined to a sun gear 5A of the planetary gear unit 5. It is also joined to the final output shaft 6 via a direct mode clutch 10.

The reduction gear unit 3 comprises a gear 3A, gear 3B and gear output shaft 3C which rotate together with the input shaft 1. The gear 3A is meshed with the gear 3B, and the gear 3B is joined to the gear output shaft 3C via a power circulation mode clutch 9. The gear output shaft 3C is joined to a planet carrier 5B which holds planet gears of the planetary gear unit 5. A ring gear 5C of the planetary gear unit 5 is joined to the final output shaft 6. The rotation of the final output shaft 6 is transmitted to the drive wheels 11A, 11B of the vehicle via a transmission output gear 7, final gear 12 and differential gear unit 8.

In this non-finite speed ratio transmission device, the drive of the drive wheels 11A, 11B is performed in two kinds of power transfer mode, i.e., a power circulation mode wherein the power circulation mode clutch 9 is engaged and the direct mode clutch 10 is released, or a direct mode wherein the power circulation mode clutch 9 is released and the direct mode clutch 10 is engaged.

In the power circulation mode, the rotation speed of the planet carrier 5B is equal to a value obtained by dividing the engine rotation speed by the reduction ratio of the reduction gear unit 3. The reduction ratio of the reduction gear unit 3 is a fixed value. On the other hand, the rotation speed of the sun gear 5A is equal to a value obtained by dividing the engine rotation speed by the speed ratio ic of the continuously variable transmission 2.

The rotation direction of the sun gear 5A and planet carrier 5B is always fixed.

Under these conditions, the rotation direction of the ring gear 5C which is joined to the final output shaft 6 varies according to the ratio of the rotation speed of the planet carrier 5B, and the rotation speed of the sun gear 5C. In other words, it varies according to the ratio of the engine rotation speed and the rotation speed of the CVT output shaft 4, i.e., according to the speed ratio ic of the continuously variable transmission 2. The point at which the rotation direction changes corresponds to a geared neutral position GNP shown in FIG. 9.

At the geared neutral position GNP, the ring gear 5C i.e., the final output shaft 6, does not rotate, and the vehicle stops. Even at the geared neutral position GNP, the input disk 21 and output disk 22 of the CVT 2 are rotating relative to each other, but torque is not transmitted between the output disk 22 and final output shaft 6, so torque is not transmitted between the input disk 21 and output disk 22 either.

If the speed ratio ic increases beyond the geared neutral position GNP, the ring gear 5C rotates in the forward travel direction of the vehicle and if the speed ratio ic decreases to less than the GNP, the ring gear 5C rotates in the reverse direction. That is, in the power circulation mode, vehicle forward and reverse are changed over by controlling the speed ratio ic.

Figure 9:
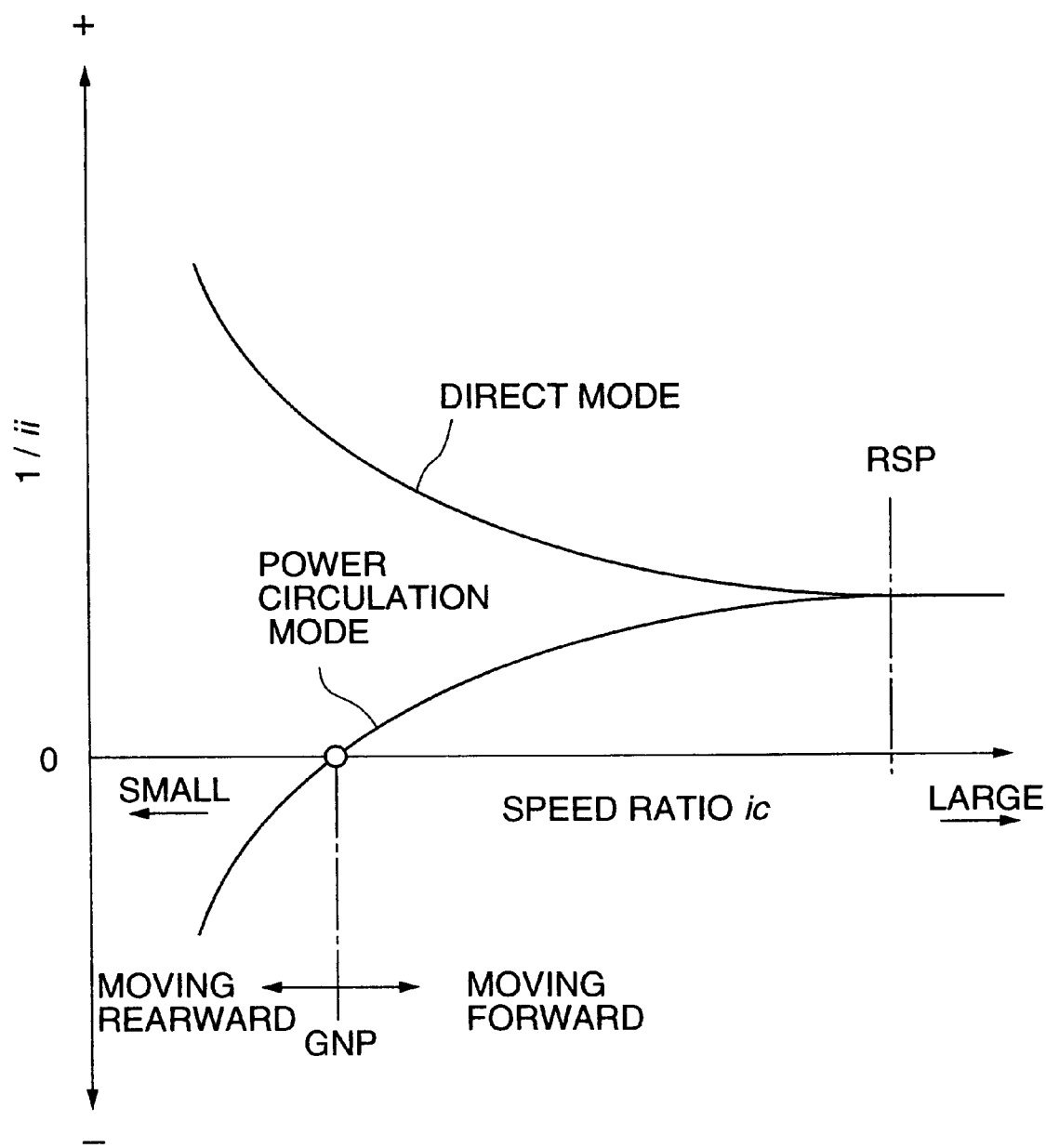
FIG. 9 is a diagram showing a relation between the speed ratio ic of the toroidal continuously variable transmission and an inverse 1/ii of a speed ratio of the non-finite speed ratio transmission device.
Figure 18:
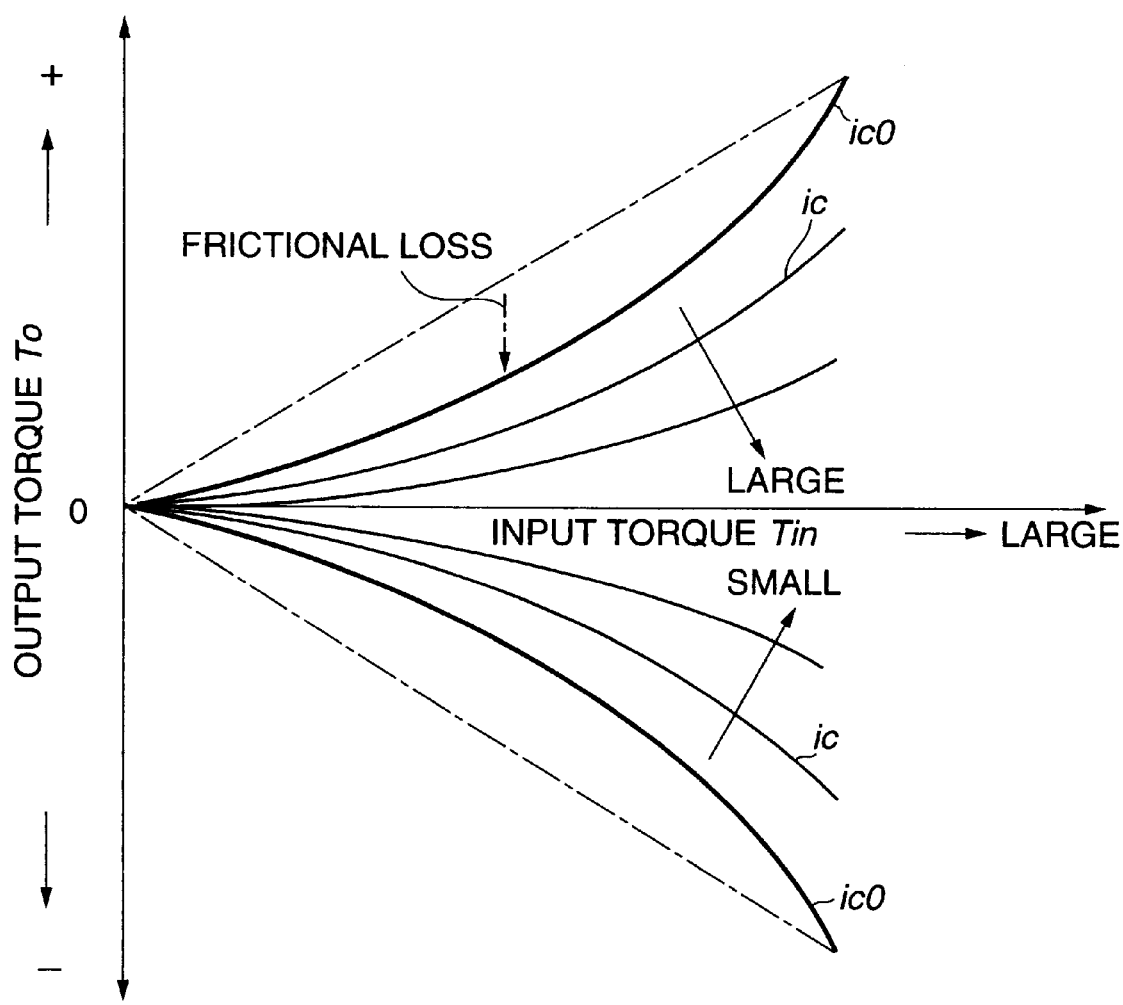
FIG. 18 is a map specifying a relation of an input torque Tin and output torque To of a final output shaft according to a fifth embodiment of this invention.

When the vehicle advances in the power circulation mode, as the speed ratio ic of the continuously variable transmission 2 increases, the final speed ratio ii of the non-finite speed ratio continuously variable transmission decreases. In other words, the inverse 1/ii of the final speed ratio ii increases, as shown in FIG. 9. When the final speed ratio ii reaches a certain value, the power circulation mode shifts to the direct mode. In the direct mode, the rotation of the CVT output shaft 4 is directly transmitted to the final output shaft 6, so as the speed ratio ic of the continuously variable transmission 2 decreases, the final speed ratio ii of the non-finite speed ratio transmission device also decreases. In other words, as the speed ratio ic decreases, the inverse 1/ii increases as shown in FIG. 18.

Thus, the final speed ratio ii of the non-finite speed ratio continuously variable transmission is largest when the vehicle starts. After the vehicle starts, it decreases as the vehicle speed increases. The speed ratio ic of the continuously variable transmission at this time first begins to increase up to a revolution synchronization point RSP, and after the power circulation mode changes over to the direct mode at the revolution synchronization point RSP, it begins to decrease. When the vehicle is decelerating as it runs, the speed ratio ic of the continuously variable transmission 2 varies in an opposite direction to when the vehicle is accelerating. These characteristics of the non-finite speed ratio transmission device are disclosed in Tokkai Hei 9-89071 published by the Japanese Patent Office in 1997.

When the vehicle is moving forward, it corresponds to the case where a selector lever in the vehicle, not shown, selects a normal running range D or sports running range Ds. When the vehicle is moving backwards, it corresponds to the case where the selector lever selects a reverse range R.

During reverse, the speed ratio ic becomes smaller than that of the geared neutral position GNP, and as the speed ratio ic decreases, the absolute value of 1/ii increases in the negative direction. That is, the final speed ratio ii approaches 0.

In the following description, the speed ratio ic corresponding to the geared neutral position GNP will be referred to as ic0, and the gyration angle ø of the power roller 20 at that time will be referred to as $ø_0$.

The above-mentioned control of the non-finite speed ratio transmission device is performed by a microprocessor 80 via an oil pressure device shown in FIG. 4. For this purpose, the microprocessor 80 comprises a central processing unit (CPU), read-only memory (ROM), random access memory (RAM), and an input/output interface (I/O interface).

Further, signals from an input shaft rotation speed sensor 81 which detects a rotation speed Ni of the input shaft 1, CVT output shaft rotation speed sensor 82 which detects a rotation speed Nco of the CVT output shaft 4, vehicle speed sensor 83 which detects the vehicle speed VSP from the rotation speed of the final output shaft 6, a depression amount signal from an accelerator pedal depression sensor 86 and a brake signal showing if a vehicle brake pedal is depressed as detected by a brake switch 87, are respectively input into the microprocessor 80.

The rotation speed Ni of the input shaft 1 is equal to the rotation speed Ne of the engine.

Next, the oil pressure device will be described referring to FIG. 4. The oil pressure device comprises a pressure regulator 100 which converts an oil pressure supplied from an oil pump 120, to a predetermined line pressure PL.

The pressure regulator 100 performs this pressure adjustment according to a signal pressure produced by a solenoid valve 90, and supplies the line pressure PL to a line pressure circuit 101.

A shift control valve 46 which controls the supply direction and amount of oil to the hydraulic cylinders 30 which drive the trunnions 23, is connected to the line pressure circuit 101.

The shift control valve 46 is provided with a supply port 46P connected to the line pressure circuit 101, speed ratio increase port 46L connected to the oil chambers 30A of the hydraulic cylinders 30, speed ratio decrease port 46H connected to the oil chambers 30B of the hydraulic cylinders 30, and two drain ports 46D. The line pressure PL is supplied from the supply port 46P to the speed ratio increase port 46L or the speed ratio decrease port 46H according to the position of the spool 46S in the axial direction, the other of the ports 46L and 46H being connected to the drain port 46D.

When the spool 46S is in the neutral position, the supply port 46P, drain port 46D, speed ratio increase port 46L and speed ratio decrease port 46H are all blocked, and the oil pressures of the oil chambers 30A, 30B, are maintained without variation.

If the step motor 36 drives the speed change link 37 from the neutral position towards the upper part of FIG. 4 so as to obtain a given target speed ratio, the spool 46S which is displaced in the same direction connects the supply port 46P to the speed ratio increase port 46L, and connects the speed ratio decrease port 46H to the drain port 46D.

Consequently, a high oil pressure corresponding to the opening of the supply port 46P is supplied to the speed ratio increase port 46L, the pressure in the oil chambers 30A of the continuously variable transmission 2 rises, and the pressure in the oil chambers 30B falls.

Due to this differential pressure, the right-hand trunnion 23 moves up and the left-hand trunnion 23 moves down as shown by the solid line in FIG. 3.

Hence, the contact positions of the power rollers 20, and input disk 21 and output disk 22 shift, and the power rollers 20 and trunnion 23 are caused to rotate around the axis of the trunnion 23 due to a component force in the horizontal direction of the figure exerted by the input disk 21 and output disk 22 on the power rollers 20. This rotational displacement causes a variation of the gyration angle ø in a direction tending to increase the speed ratio ic. Here, the speed ratio ic is a value obtained by dividing the rotation speed Ni of the input shaft 1 by the rotation speed Nco of the CVT output shaft 4.

At this time, the axial displacement and rotational displacement of the right-hand trunnion 23 in FIG. 3 which is connected to the precess cam 35, cause the speed change link 37 to displace towards the lower part of FIG. 4 via the precess cam 35 and feedback link 38.

As a result, the spool 46S which was moving upward, starts moving downward toward the neutral position.

The spool 46S reaches the neutral position when the gyration angle ø of the power rollers 20 coincides with the target speed ratio, and the hydraulic cylinders 30 stop driving the pistons 31.

Conversely, if the step motor 36 drives the spool 46S towards the lower part of FIG. 4 from the neutral position, the spool 46S connects the supply port 46P to the speed ratio reduction port 46H, and connects the speed ratio increase port 46L to the drain port 46D.

Consequently, a high oil pressure corresponding to the aperture of the supply port 46P is supplied to the speed ratio decrease port 46H, the pressure of the oil chambers 30A of the continuously variable transmission 2 falls, and the pressure of the oil chambers 30B rises.

Due to this differential pressure, the right-hand trunnion 23 moves down and the left-hand trunnion 23 moves up as shown by the broken line in FIG. 3, the power rollers 20 and the trunnions 23 undergo a rotational displacement, and the gyration angle ø is varied in a direction tending to decrease the speed ratio ic.

At this time, the axial displacement and rotational displacement of the right-hand trunnion 23 in FIG. 3 which is connected to the precess cam 35, cause the speed change link 37 to displace towards the upper part of FIG. 4 via the precess cam 35 and feedback link 38.

Hence, the spool 46S which had moved down, displaces upwards toward the neutral position. When the gyration angle ø of the power rollers 20 coincides with the target speed ratio, the spool 46S reaches the neutral position and the hydraulic cylinders 30 stop driving the pistons 31.

The microprocessor 80 calculates the step number STEP of the step motor 36 based on the target value of the speed ratio ic of the continuously variable transmission 2. The target value of the speed ratio ic is calculated as follows.

Specifically, the final speed ratio ii of the non-finite speed ratio transmission device is first determined based on the accelerator pedal depression amount and vehicle speed VSP by the same technique as in the calculation of target speed ratio of a continuously variable transmission disclosed by Tokkai Sho 61-105347 published in 1986 by the Japanese Patent Office. Based on the final speed change ratio ii thus determined, the microprocessor 80 looks up the corresponding target speed ratio of the continuously variable transmission 2 from the map of FIG. 9, and calculates the step number STEP corresponding to target speed change ratio. This map is stored beforehand by the microprocessor 80. In this map, the minimum value of the step number STEP corresponds to the maximum speed ratio of the continuously variable transmission 2, and the gyration angle ø of the power roller 20 is a minimum. The maximum value of the step number STEP corresponds to the minimum speed ratio of the continuously variable transmission 2, and the gyration angle ø of the power roller 20 is a maximum. The target value of the differential pressure of the oil chambers 30A and 30B may also be calculated instead of the speed ratio ic, and the step number STEP determined according to this target value.

By outputting a signal corresponding to the step number STEP calculated in this way to the step motor 36, the microprocessor 80 controls the speed ratio ic of the continuously variable transmission 2. i.e., to change over between the power circulation mode and the direct mode, a solenoid valve 91 which engages and releases the direct mode clutch 10, and a solenoid valve 92 which engages and releases the power circulation mode clutch 9, are connected to the line pressure circuit 101.

The solenoid valve 91 produces a signal pressure which increases or decreases the line pressure PL of the line pressure circuit 101 according to a signal from the microprocessor 80, and supplies it to a control valve 93. The control valve 93 supplies the line pressure PL to the direct mode clutch 10 via a manual valve 60 according to the increase of signal pressure and engages the direct mode clutch 10. On the other hand, when the signal pressure from the solenoid valve 91 decreases, the control valve 93 connects the direct mode clutch 10 to the drain, and the direct mode clutch 10 is released. Likewise, the solenoid valve 92 produces a signal pressure by decreasing the line pressure PL of the line pressure circuit 101 according to a signal from the microprocessor 80, and supplies it to a control valve 94. The control valve 94 supplies the line pressure PL to the power circulation mode clutch 9 according to the increase of signal pressure via a manual valve 60 and a shuttle valve 121, and engages the power circulation mode clutch 9. On the other hand, when the signal pressure from the solenoid valve 92 decreases, the control valve 94 releases the power circulation mode clutch 9 by connecting it to a drain.

When the microprocessor 80 outputs an engaging signal to either of the solenoid valves 91 and 92, a release signal is always output to the other valve. Due to this signal operation, either the power circulation mode clutch 9 or the direct mode clutch 10 is engaged and the other clutch is released, i.e., the power circulation mode and the direct mode are changed over. These mode change-overs are performed when the speed ratio ic of the continuously variable transmission 2 reaches the revolution synchronization point RSP, as shown in FIG. 9.

The change-over of drive force transmission modes and control of the speed ratio ic of the continuously variable transmission 2 are performed as described above. The microprocessor 80 also performs control of the transmitted torque of the continuously variable transmission 2 so that a desirable creep torque is obtained in the vicinity of the neutral position GNP of the power circulation mode.

Next, this creep torque control routine will be described referring to the flowchart of FIG. 6.

This routine is performed at an interval of, for example, 10 milliseconds.

First, in a step SI, the vehicle speed VSP detected by the vehicle speed sensor 83, the rotation speed Ni of the input shaft 1 detected by the input shaft rotation speed sensor 81, the rotation speed Nco of the CVT output shaft 4 detected by the CVT output shaft rotation speed sensor 82, the accelerator pedal depression amount Acc detected by the accelerator pedal depression sensor 86 and a brake signal generated by the brake switch 87 are read.

In a following step S2, it is determined whether or not the vehicle speed VSP is less than a predetermined speed VSP0. Here, the predetermined speed VSP0 is a value near zero, so if the vehicle speed VSP is less than the predetermined speed VSP0, it means that the speed ratio ic of the continuously variable transmission 2 is near the geared neutral position GNP of the power circulation mode.

When the vehicle speed VSP is less than VSP0, the routine proceeds to a step S3, and it is determined if the accelerator pedal depression amount Acc is zero. When Acc is zero, the routine performs creep torque control in a step S4 and subsequent steps. When the vehicle speed VSP is not less than VSP0 in the step S2 or the accelerator pedal depression Acc is not zero in the step S3, after performing the usual control of the speed ratio ic in a step S9, the routine is terminated.

In the step S4, the present real speed ratio ic is calculated from the rotation speed Ni of the input shaft 1 and the rotation speed Nco of the CVT output shaft 4 by the following equation (1). The corresponding gyration angle ø may be calculated instead of the speed ratio ic.

$$ic = Ni/Nco \tag{1}$$

In theory, the final speed ratio ii of the non-finite speed ratio transmission device can also be used instead of the speed ratio ic of the CVT 2. However, at the geared neutral position GNP, as the rotation speed of the final output shaft 6 is 0, it is difficult to grasp the exact final speed ratio ii. On the other hand, as both the input shaft 1 and the CVT output shaft 4 are rotating even at the geared neutral position GNP as long as the engine is running, a slight fluctuation of the speed ratio ic can be grasped accurately.

In a following step S5, a target creep torque Tc is set. The target creep torque Tc is set to different values respectively for when the vehicle is moving forward and when it is reversing. Forward and reverse motion of the vehicle can be distinguished from a selector lever attached to the non-finite speed ratio transmission device.

Specifically, when the selector lever selects the ordinary forward running range (D) or forward sports running range (Ds), the vehicle is moving or about to move forward, and when the selector lever selects the reverse range (R), the vehicle is reversing or about to reverse.

Further, different values of the target creep torque Tc are set depending on whether or not the brake pedal of the vehicle is depressed. For example, when the vehicle is moving forward and the brake is not depressed, a large creep torque T3 is read. When the brake is depressed, a small creep torque T1 is read. Also when the vehicle is reversing, the different creep torques −T3 and −T1 are read in the same way depending on the operating state of the brake.

Figure 7:
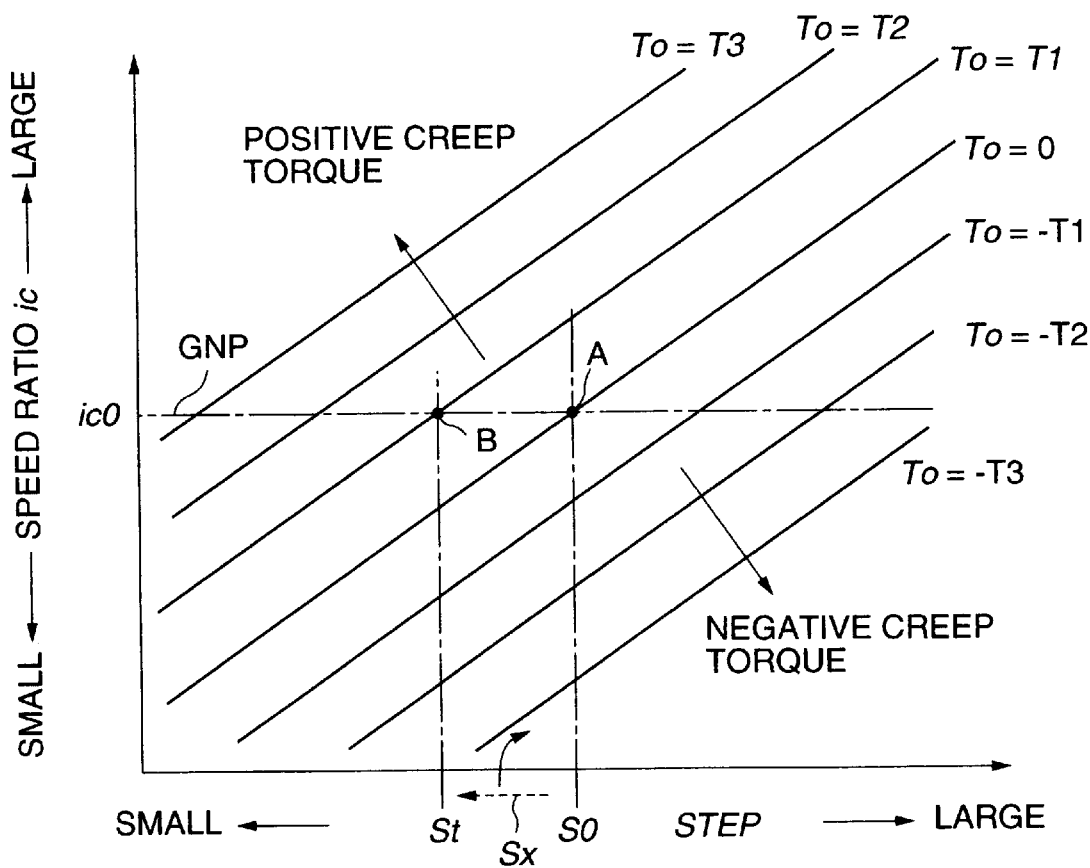
FIG. 7 is a map specifying a relation between a target step number Sx and a speed ratio ic stored in the microprocessor for generating a target creep torque Tc.

In a following step S6, a target step number of the step motor 36 required to generate the target creep torque Tc is computed by referring to a map of creep torque To shown in FIG. 7 prestored by the microprocessor 80.

In FIG. 7, the thick solid line is a line on which the creep torque To of the final output shaft 6 is 0, i.e., a state where drive force does not act on the vehicle.

In the vicinity of the geared neutral position GNP, the creep torque To gradually increases in positive direction with T1, T2 and T3 as it rises above the line To=0 in the diagram. In other words, the torque which moves the vehicle forward increases.

Conversely, the creep torque To gradually increases in a negative direction in the sense −T1, −T2, −T3 as it falls below the line To=0. In other words, the torque which reverses the vehicle increases. A point B in FIG. 7 denotes the target step number when the brake pedal is depressed and the vehicle is not moving while the selector lever is in a forward travel range. Once the vehicle has started moving, however, the target step number to obtain the target creep torque varies, because the speed ratio of the CVT 2 is no longer equal to ic0. Further, when the brake is released, the required output torque To of the final output shaft 6 is set to a different value. Therefore, in the map of FIG. 7, the target step number St is determined based on the present real speed ratio ic and the required output torque To of the final output shaft 6.

In a following step S7, the difference of the target step number St and the present step number S0 is calculated as a command step number Sx.

Herein, the present step number S0 is equal to the step number output to the step motor 36 on the immediately preceding occasion when the routine was performed.

In a following step S8, the command step number Sx is output to the step motor 36, and the routine is terminated.

Referring again to FIG. 7, the present step number S0 when the present speed ratio ic is equal to ic0, i.e., the geared neutral position GNP, corresponds to a point A where the line To=0 and the line ic=ic0 cross. In this case, if the target creep torque Tc is set to the creep torque T1 for forward motion, the point B at which the line To=T1 and the line ic=ic0 cross becomes the new rotation position of the step motor 36.

If the microprocessor 80 outputs the difference Sx between the step number St corresponding to the point B and the step number S0 corresponding to the point A, the step number of the step motor 36 will decrease. Due to the decrease of step number, the step motor 36 displaces the spool 46S of the shift control valve 46 in the direction which increases the speed ratio ic of the CVT 2. Consequently, the oil chambers 30A rise to higher pressure than the oil chambers 30B and the pistons 31 exert a drive force on the trunnions 23 in the direction of the solid line of FIG. 3.

When the selector lever is in the forward travel range D or Ds, the driver operates the brake and the stop state is maintained under a predetermined braking torque, the rotation speed of the final output shaft 6 is 0.

In this case, the speed ratio ic of the continuously variable transmission 2 is forcibly held at the speed ratio ic0 which corresponds to the geared neutral position GNP. That is, even if the pistons 31 exert a force on the trunnions 23 in the direction of the solid line of FIG. 3, the gyration angle of the power roller 20 does not vary.

At that time, the power roller 20 which tends to vary the gyration angle ø in a direction which would increase the speed ratio, causes a torque to act on the output disk 22 in the direction of deceleration. In the power circulation mode, the vehicle starts moving forward when the speed ratio of the continuously variable transmission 2 increases, as can be seen from FIG. 9. The deceleration torque which acts on the output disk 22 is therefore a torque tending to rotate the final output shaft 6 in the forward travel direction, i.e., it acts as a creep torque in the forward travel direction. Thus, in the vicinity of the geared neutral position GNP of the power circulation mode, when the present speed ratio ic is maintained by applying the brake of the vehicle, an arbitrary creep torque To can be generated by driving the step motor 36 with a step number STEP according to the target creep torque Tc.

Of course, when the speed ratio ic deviates from the geared neutral position GNP and the vehicle is moving an arbitrary creep torque To can be obtained by setting the target step number St as in the above case.

In a toroidal continuously variable transmission, a phenomenon known as a torque shift occurs according to the fluctuation of input torque, as disclosed in Tokkai Hei 8-338492 published in 1996 by the Japanese Patent Office. This refers to a phenomenon wherein an elastic deformation is produced in a supporting member of the power roller 20 due to the fluctuation of input torque, and this deformation brings an error in the feedback motion of the precess cam 35 and the other mechanical feedback members.

Consequently, a deviation occurs in the correspondence relation between the real gyration angle ø of the power roller 20, and the step number STEP output to the step motor 36. A torque shift during normal running occurs due to the fluctuation of an input torque, but in a non-finite speed ratio transmission, when the speed ratio ic of the CVT 2 is forcibly held at a fixed value as mentioned above, a torque shift also occurs when it is attempted to displace the trunnion 23 in the axial direction.

In this case, a deviation of the speed ratio ic in the decreasing direction increases creep torque in the forward travel direction of the vehicle, and a deviation of the speed ratio ic in the increase direction increases the creep torque in the reverse direction.

As a result of the torque shift, the spool 46S of the shift control valve 46 returns to the center position, and even if the target speed ratio corresponding to the step number STEP of the step motor 36 is apparently obtained, the real speed ratio does not reach the target speed change ratio. Hence, a torque corresponding to this deviation acts on the output disk 22. On the other hand, after the spool 46S returns to the center position, the oil pressures of the oil chambers 30A, 30B are maintained as they are.

Therefore, by utilizing torque shift, creep torque can continue to be generated by maintaining the shift control valve 46 in the neutral state.

Creep torque can still be generated by an oil pressure according to the target creep torque Tc even when the oil pressure applied to the piston is fed back electronically when the continuously variable transmission does not comprise mechanical feedback members using a precess cam, as in the speed ratio continuously variable transmission disclosed in U.S. Pat. No. 5,935,039 of the aforesaid prior art. However, In such a control technique, it is difficult to ensure precise control of the creep torque when oil temperature is low.

As the non-finite speed ratio transmission provided with a mechanical feedback member can perform feedback control of creep torque by a mechanical system without performing electronic feedback, the precision of controlling creep torque does not decline even at low oil temperature. Moreover, by considering the effect of the above-mentioned torque shift beforehand and determining the step number STEP according to the target creep torque Tc, the creep torque can be controlled with high precision.

Next, the relation of the output torque To of the final output shaft 6, step number STEP of the step motor 36 and the speed ratio ic of the continuously variable transmission 2 will be described in the state where the driver depresses the brake and prevents rotation of the final output shaft 6 near the geared neutral position GNP of the power circulation mode of this non-finite speed ratio transmission device.

Figure 8A:
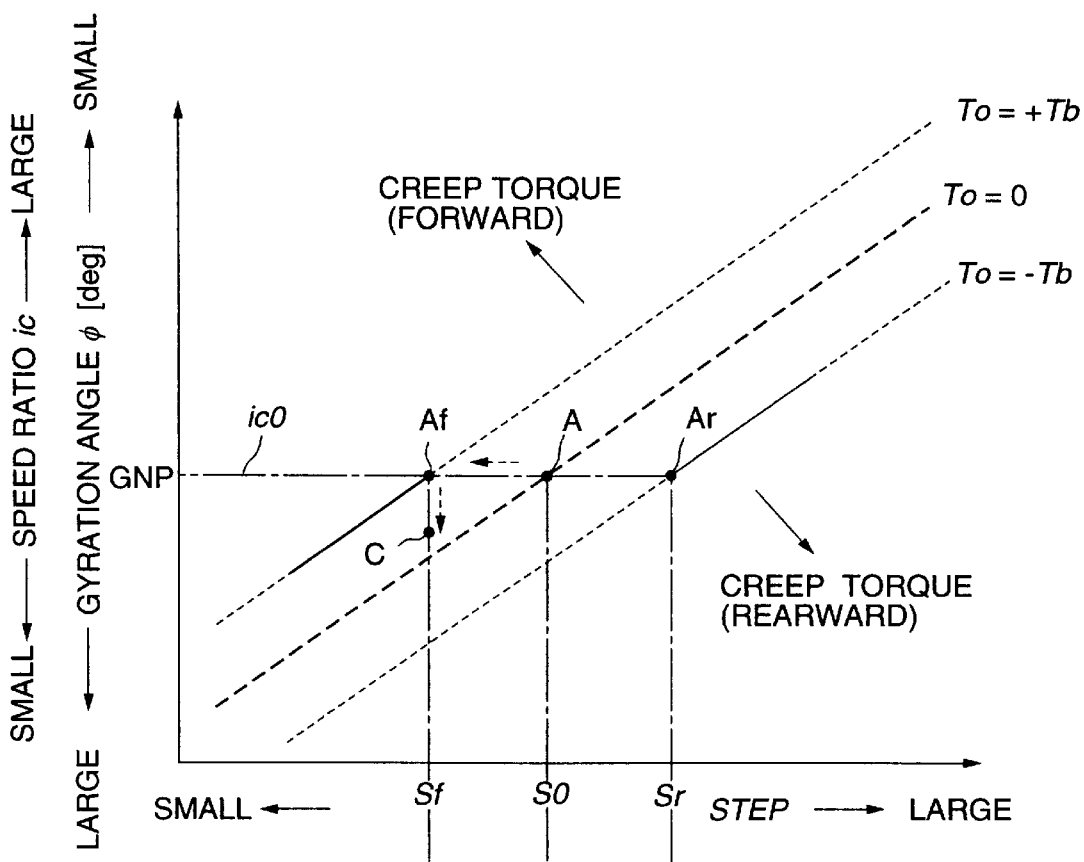
FIGS. 8A and 8B are diagrams describing a variation of a creep torque To in the vicinity of a geared neutral position GNP according to this invention.

As shown in FIG. 8A, when the speed ratio ic of CVT 2 is equal to ic0 and the step number STEP of the step motor 36 is equal to the no-load position S0 at which the line output torque To=0 and the line ic=ic0 cross, creep torque is not generated.

Next, the state where the driver depresses the brake and exerts a braking torque Tb on the final output shaft 6 will be considered.

Figure 8B:
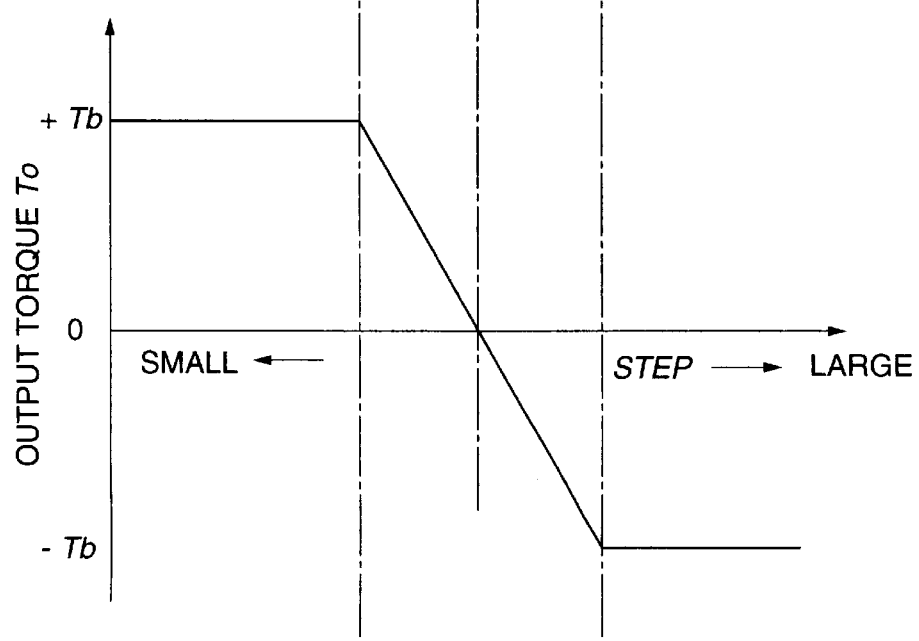

In this state, if the output torque To of the continuously variable transmission 2 is within the limits of +Tb to −Tb as shown in FIG. 8B, the vehicle will remain in the stop state.

In FIG. 8A, if the step number STEP of the step motor 36 decreases from S0 to Sf, the pressure of the oil chamber 30A rises above that of the oil chamber 30B, and the trunnion 23 displaces in the axial direction to the upper part of FIG. 3.

At that time, the rotation speed of the final output shaft 6 is limited to 0 due to the braking of the driver, and the gyration angle ø of the power roller 20 corresponding to geared neutral position GNP cannot vary from $ø_0$, so the speed ratio ic is still ic0.

On the other hand, the step number STEP shifts from point A to point Af of FIG. 8A, so the output torque To of the final output shaft 6 increases from 0 to +Tb.

That is, the output torque To of the final output shaft 6 can be increased to +Tb and creep torque can be generated while maintaining the speed ratio ic at ic0 corresponding to the geared neutral position GNP.

After the step number STEP of the step motor 36 reaches Sf, provided that the stop state of the vehicle is maintained, the gyration angle ø of the power roller 20 is still $ø_0$, so the mechanical feedback members comprising the precess cam 35 of the continuously variable transmission 2 only transmit the axial displacement of the trunnion 23 to the spool 46F.

As a result, the spool 46S returns to the neutral position while the creep torque is still generated.

When the driver releases the brake, the speed ratio of the CVT 2 increases from point Af to point C while the step STEP does not vary, and the vehicle will start moving forward.

However, the vehicle will stop at a point C at which the output torque coincides with the running resistance. This is due to idle rotation speed control of the engine, not shown. When the creep torque To increases from the point A to the point Af in the figure, the engine load increases, and the fuel injection amount of the engine increases. On the other hand, in going from the point Af to the point C, the engine load also decreases as the creep torque To decreases, and the fuel injection amount of the engine decreases until the drive resistance and engine output of the vehicle are balanced. Consequently, the forward motion of the vehicle stops.

When the creep torque To is generated in the reverse direction, an arbitrary creep torque To can be generated in a range from the point A to a point Ar at which the braking torque −Tb is balanced by varying the step number STEP of the step motor 35 in the range from S0 to Sr, as in the case where the step number STEP is made to vary from S0 to Sf.

By prestoring a map which sets the relation of the creep torque To and step number STEP as shown in FIG. 7 in the microprocessor 80, the target creep torque Tc can be obtained easily and surely regardless of oil temperature by driving the step motor 36 to the step number STEP which corresponds to the target creep torque Tc.

As a result of the target speed ratio command in the form of the step number STEP of the step motor 36 and the feedback of real speed ratio by the mechanical feedback members, this non-finite speed ratio transmission device also always performs precise speed ratio control regardless of oil temperature during normal running where the speed ratio ic of the CVT 2 varies largely.

Next, a second embodiment of this invention will be described referring to FIGS. 10–13.

Figure 10:
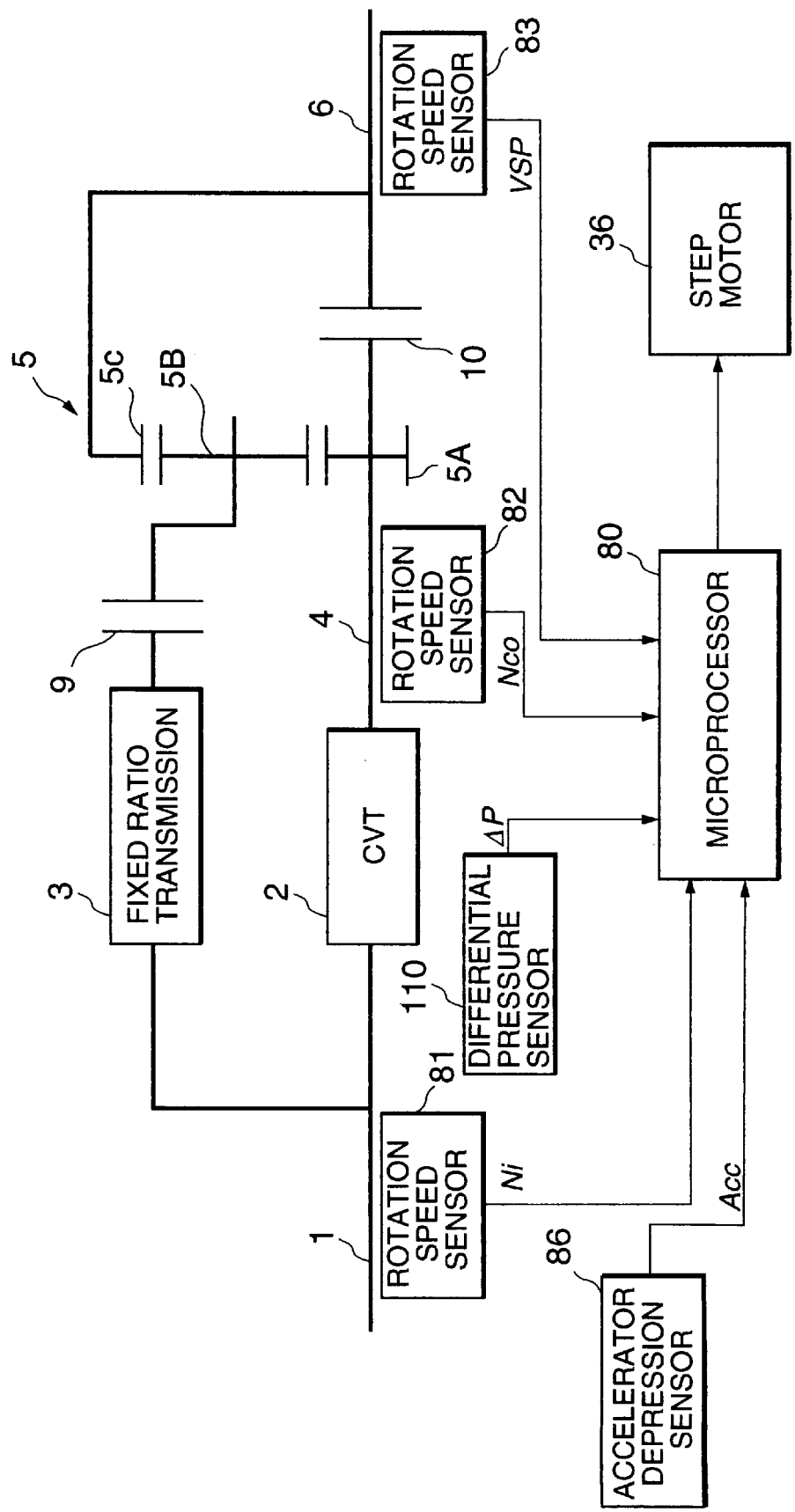
FIG. 10 is a schematic diagram of a speed ratio controller according to a second embodiment of this invention.

In addition to the construction of the first embodiment, the non-finite speed ratio transmission device according to this embodiment comprises a differential pressure sensor 110 shown in FIG. 10 which detects a differential pressure ΔP of the oil chambers 30A and 30B of the cylinder 30. The microprocessor 80 performs electronic feedback control so that the target creep torque Tc according to the differential pressure ΔP may be realized.

Figure 11:
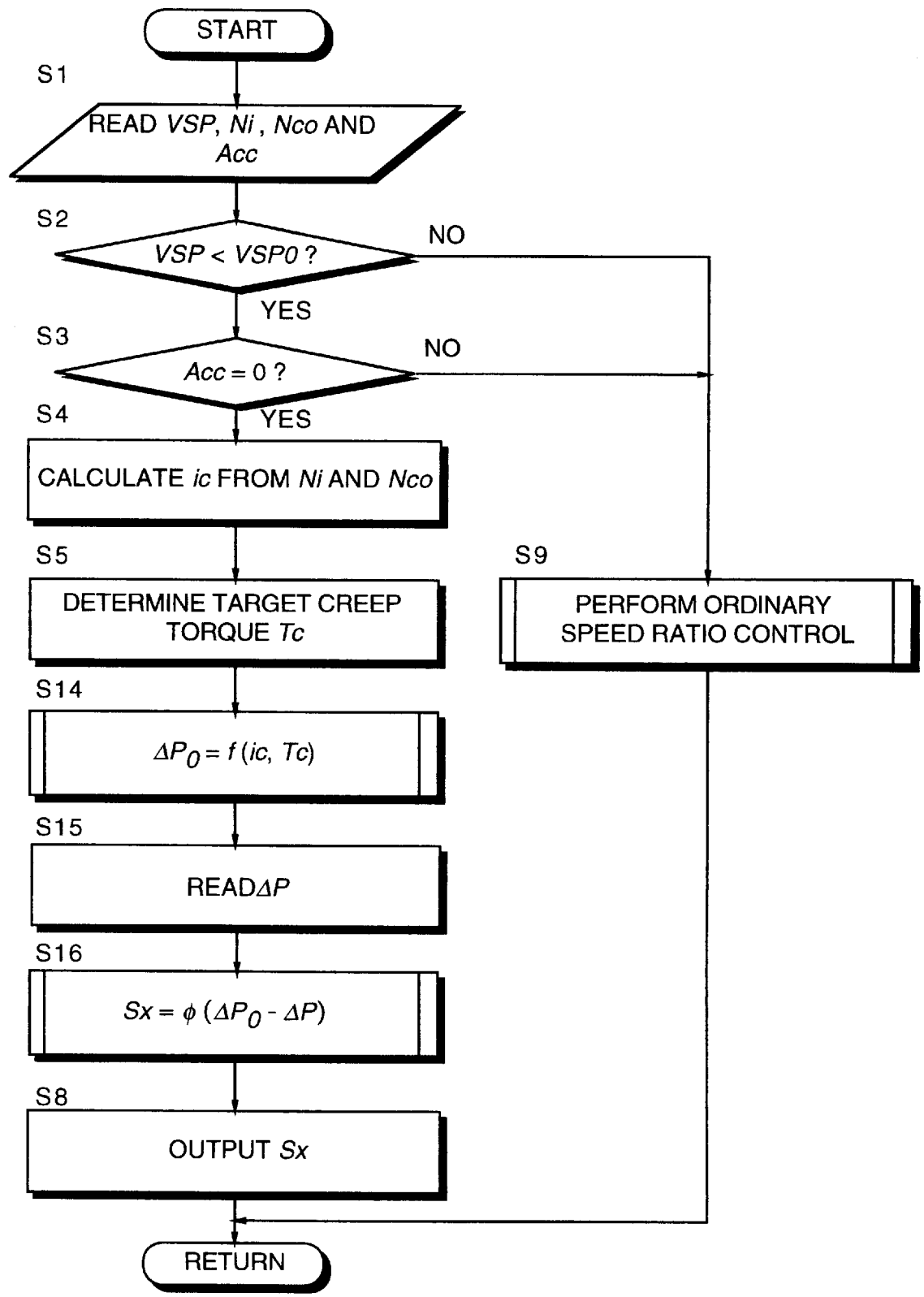
FIG. 11 is a flowchart describing a creep torque control routine performed by a microprocessor according to the second embodiment of this invention.

The routine whereby the microprocessor 80 controls the creep torque is shown in FIG. 11.

Figure 6:
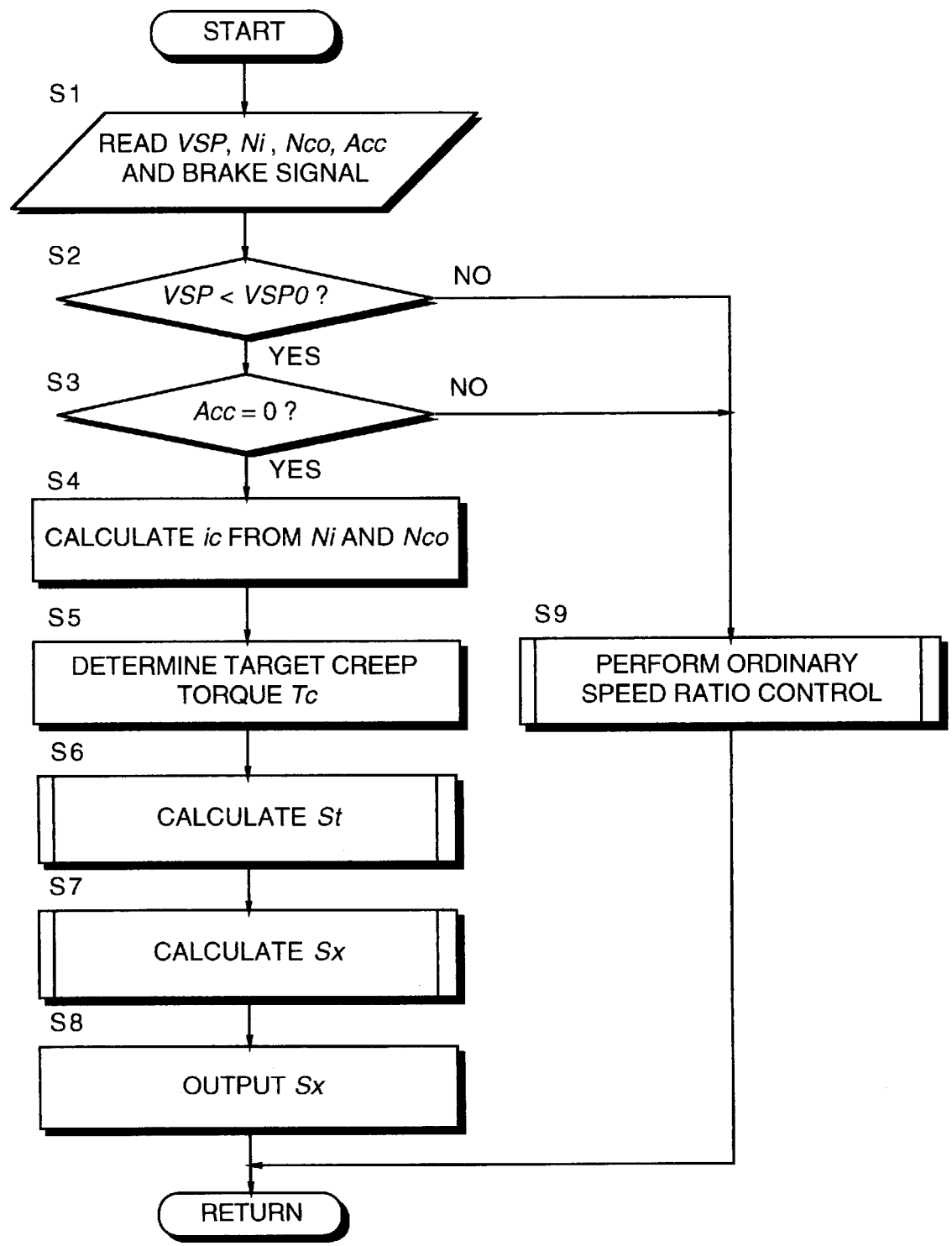
FIG. 6 is a flowchart describing a creep torque control routine performed by a microprocessor according to this invention.

The difference between this routine and the routine of FIG. 6 of the aforesaid first embodiment is that steps S14–S16 are provided instead of the steps S6 and S7.

Figure 12:
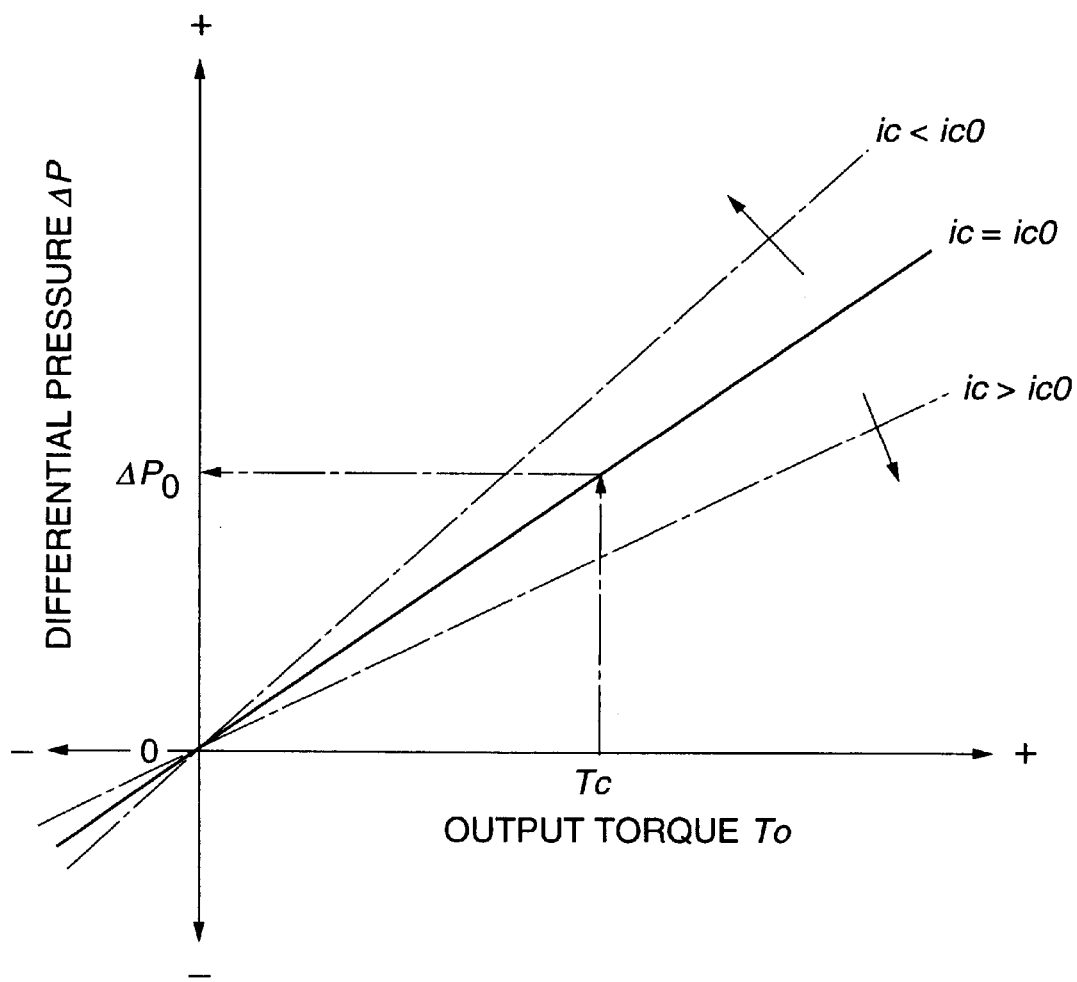
FIG. 12 is a map specifying a relation of an output torque To and a differential pressure ΔP stored by the microprocessor according to the second embodiment of this invention.

In the step S14, a target differential pressure $P\Delta_0$ is computed from the required output torque To of the final output shaft 6 and the present speed ratio ic by looking up a map shown in FIG. 12. Herein, the required output torque To is equal to the target creep torque Tc. The target differential pressure $\Delta P_0$ is given by the following equation (2), where the oil pressure of the oil chamber 30A is Plo and the oil pressure of the oil chamber 30B is Phi.

$$\Delta P_0 = Phi - Plo \qquad (2)$$

In the map of FIG. 12, the solid line gives a target differential pressure $\Delta P_0$ corresponding to the output torque To when the present speed ratio ic is the value ic0 which corresponds to the geared neutral position GNP. When the present speed ratio ic is less than ic0, the target differential pressure $\Delta P_0$ is found using the line ic<ic0 shown by the dotted line. When the present speed ratio is greater than ic0, the target differential pressure $\Delta P_0$ is found using the line ic>ic0 shown by another dotted line. Although not shown in this figure, plural lines are actually used depending on the speed ratio ic for finding the target differential pressure $\Delta P_0$, both for the case ic<ic0 and the case ic>ic0.

In a step S15, the present differential pressure ΔP detected by the differential pressure sensor 110 is read.

In a step S16, the command step number St of the step motor 36 is calculated by the following equation (3) based on the deviation of between the target differential pressure $\Delta P_0$ and the present differential pressure ΔP.

$$Sx = \phi(\Delta P_0 - \Delta P) \qquad (3)$$

Figure 13:
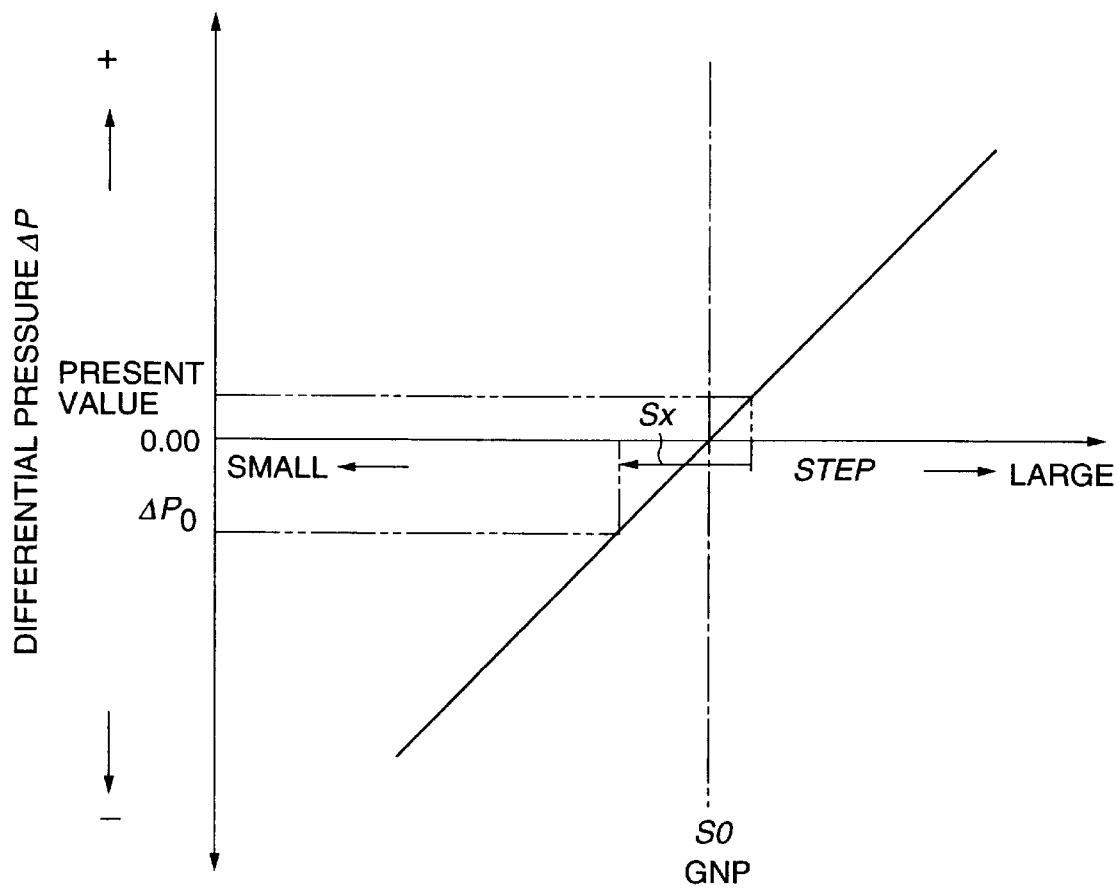
FIG. 13 is a map specifying a relation of the differential pressure ΔP and numbers of steps STEP of a step motor stored by the microprocessor according to the second embodiment of this invention.

The command step number Sx may also be found by using the map shown in FIG. 13 instead of using the above-mentioned function. This map specifies the relation of the step number STEP of the step motor 36 to the differential pressure ΔP near the geared neutral position GNP. As the differential pressure ΔP increases in the positive direction in the figure, the corresponding step number STEP increases, and conversely, if the differential pressure ΔP increases in the negative direction, the step number STEP also increases in the negative direction. Here, the increase of differential pressure ΔP in the positive direction corresponds to the increase of the oil pressure Phi of the oil chamber 30B, and increase of the differential pressure in the negative direction corresponds to the increase of the oil pressure Plo of oil chamber 30A. If this map is used, the command step number Sx is found according to the deviation between the present differential pressure ΔP and target differential pressure $\Delta P_0$. In the last step S8, the command step number Sx is output and the routine is terminated.

In this embodiment, in the vicinity of the geared neutral position GNP of the power circulation mode, the step motor 36 is run so as to achieve the differential pressure $\Delta P_0$ according to the target creep torque Tc while the present speed ratio ic is maintained.

In this embodiment also, the mechanical feedback members control the creep torque generated by the CVT 2 to the target creep torque Tc for the command step number Sx with high precision regardless of the oil temperature, as in the aforesaid first embodiment.

Figure 14:
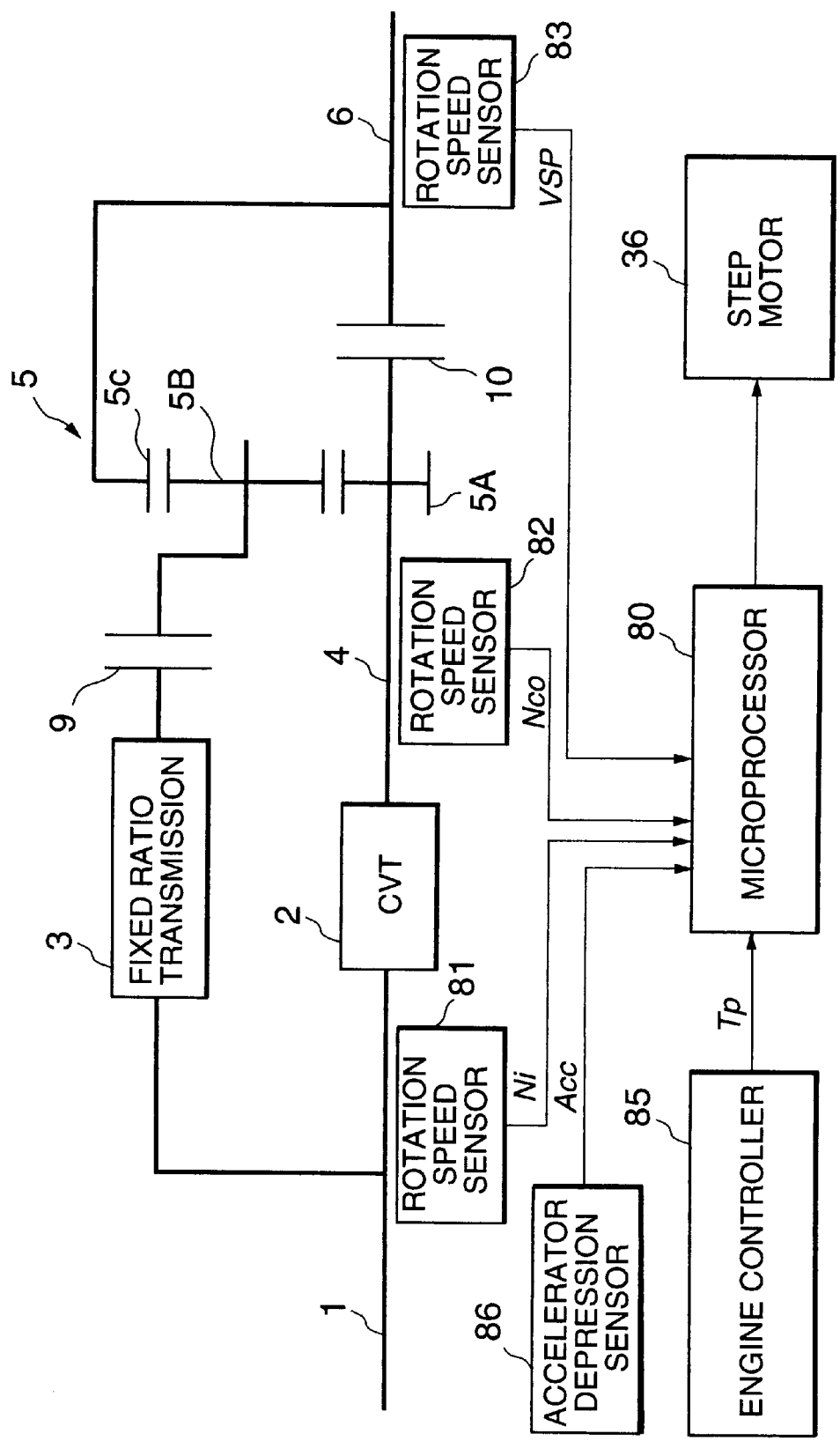
FIG. 14 is a schematic diagram of a speed ratio controller according to a third embodiment of this invention.

Next, a third embodiment of this invention will be described referring to FIG. 14–FIG. 16.

According to this embodiment, the creep torque is controlled based on a torque ratio t of the non-finite speed ratio transmission device instead of using the map of FIG. 7 as in the aforesaid first embodiment. In this embodiment, the microprocessor 80 controls the non-finite speed ratio transmission device in association with an engine controller 85, as shown in FIG. 14. When the ratio of the output torque To of the final output shaft 6 to the input torque Ti of the input shaft 1 is the torque ratio t, the output torque To is given by the following equation (4).

$$To = Ti \cdot t \qquad (4)$$

Figure 16:
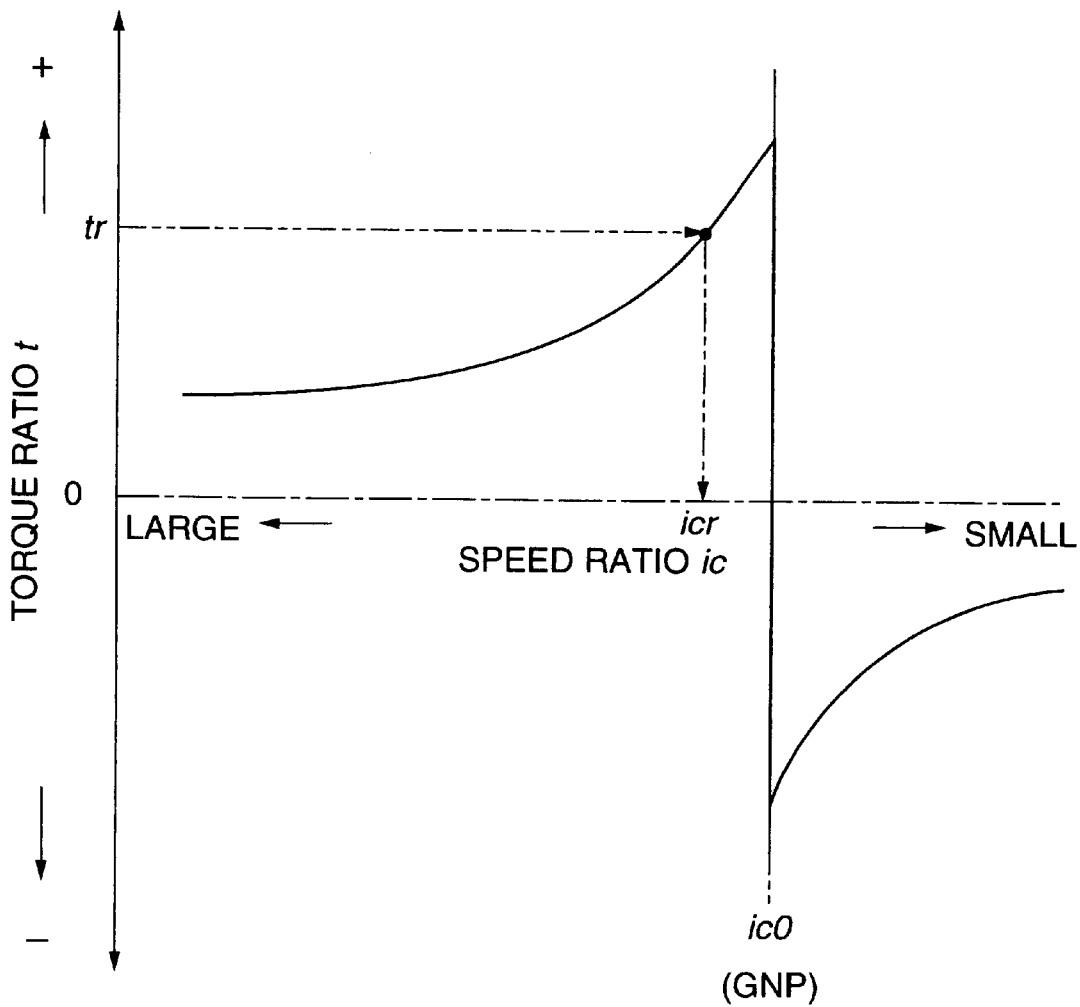
FIG. 16 is a map specifying a relation of a torque ratio t and speed ratio ic stored by the microprocessor according to the third embodiment of this invention.

As shown in FIG. 16, the torque ratio t is positive when the vehicle is moving forward and negative when the vehicle is reversing, the geared neutral position GNP at which the speed ratio ic ic0 being a change-over point, and the absolute value of the torque ratio t is a maximum at the geared neutral position GNP.

As the target creep torque Tc is equal to the required output torque To of the final output shaft 6, the target creep torque Tc can be realized by controlling the torque ratio t of the non-finite speed ratio transmission device relative to the input torque Ti.

The input torque Ti of the input shaft I is equal to the output torque Te of the engine, not shown. Various methods have been proposed to detect or estimate the output torque Te of the engine. For example, a method is known whereby the engine torque Te is found from the fuel injection amount Tp read from the engine control controller 85, and the fuel injection amount Tp is taken as the engine torque Te.

In this embodiment, the fuel injection amount Tp is considered to have the same significance the engine torque Te.

The engine control controller 85 performs idle rotation speed control of the engine so that the engine rotation speed Ne is a predetermined idle rotation speed when the vehicle is in the stop state. If the creep torque To is altered the load of the engine also varies, so the fuel injection amount Tp is also varied to maintain the predetermined idle rotation speed.

Figure 15:
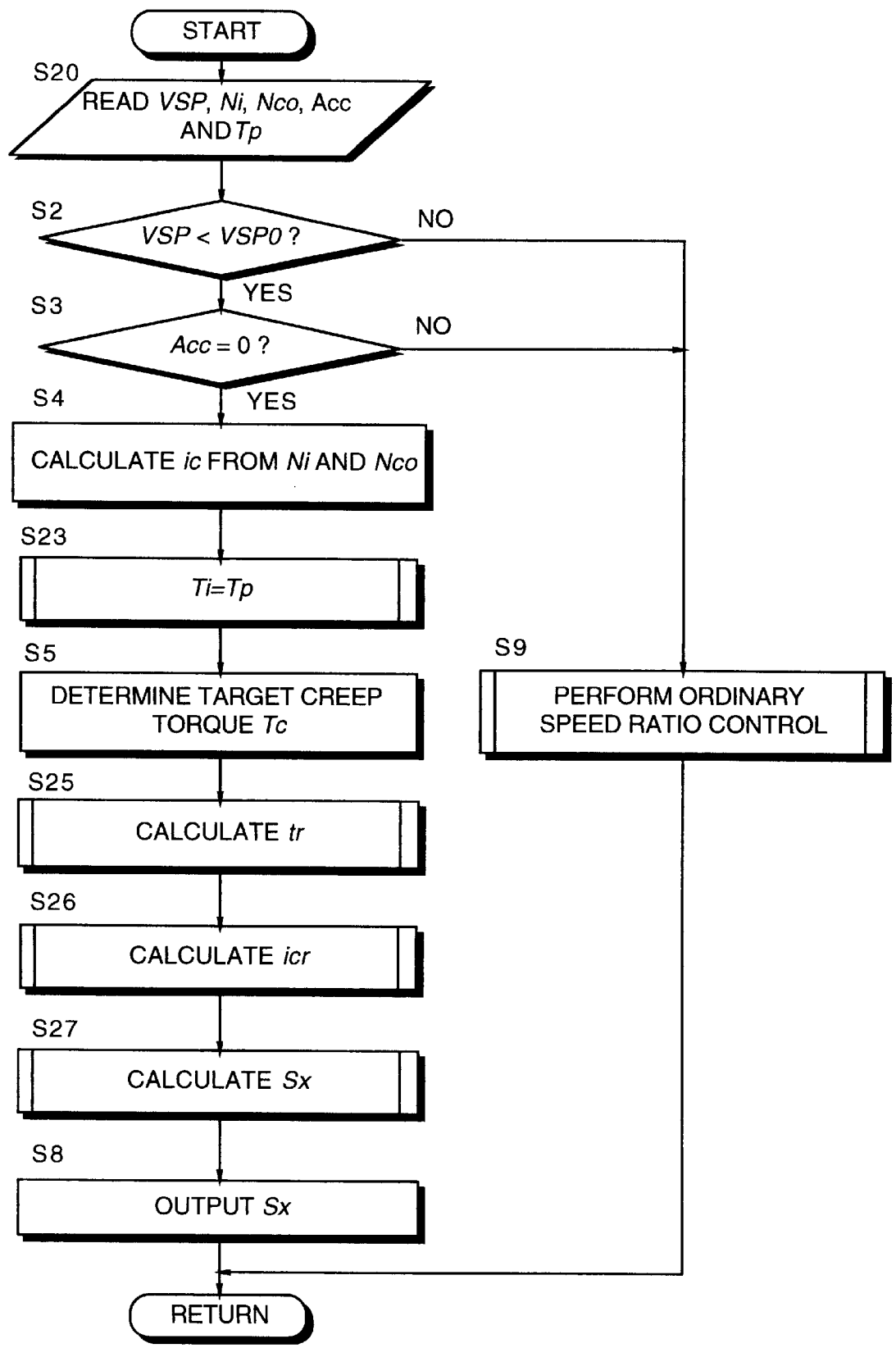
FIG. 15 is a flowchart describing a creep torque control routine performed by a microprocessor according to a third embodiment of this invention.

The flowchart of FIG. 15 corresponds to the flowchart of FIG. 6 of the aforesaid first embodiment, and shows the routine for controlling the creep torque performed by the microprocessor 80.

In a step S20, the vehicle speed VSP, rotation speed Ni of the input shaft 1, rotation speed Nco of the CVT output shaft 4 and fuel injection amount input from the engine control controller 85, are read.

The steps S2–S3, S5 and S9 are identical to those of the first embodiment.

When the vehicle speed VSP is less than the predetermined speed VSP0 in the step S2 and the accelerator pedal depression Acc is 0 in the step S3, the routine proceeds to a step S23 from the step S4.

In the step S23, the fuel injection amount Tp is set equal to the input torque Ti of the speed change ratio non-finite transmission device.

In the following step 5 the target creep torque Tc is read as in the aforesaid first embodiment.

In a following step S25, a target torque ratio tr is calculated by the following equation (5) from input torque Ti and target creep torque Tc.

$$tr = Tc/Ti \tag{5}$$

In a next step S26, a target speed ratio icr is found which corresponds to the target torque ratio tr by referring to a map of FIG. 16.

Figure 5:
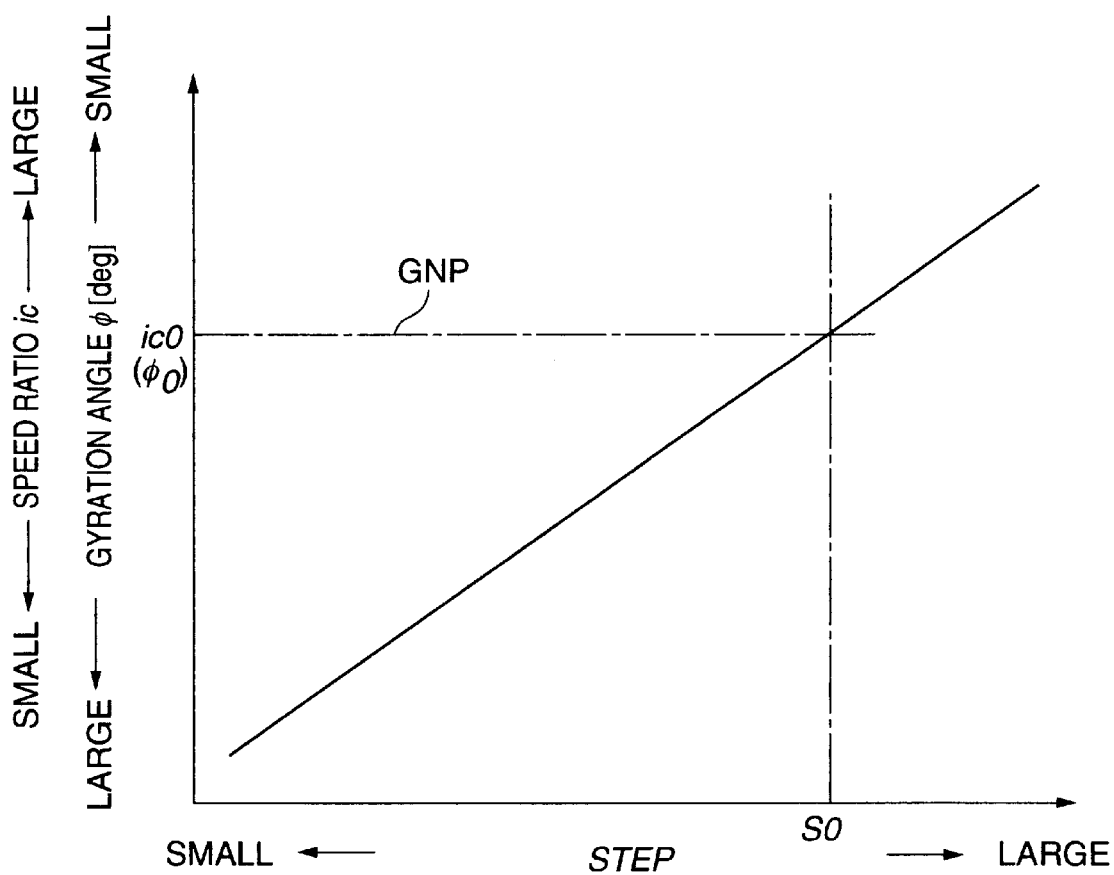
FIG. 5 is a diagram specifying a relation of a step number STEP of a step motor and a speed ratio ic of the toroidal continuously variable transmission, according to this invention.

In a step S27, the step number STEP of the step motor 36 corresponding to the target speed ratio icr is calculated as the command step number Sx from the map of usual speed ratio control of the first embodiment shown in FIG. 5.

Finally, the command step number Sx is output to the step motor 36 in the step S8, and the routine is terminated.

By performing this control routine, in the vicinity of the geared neutral position GNP of the power circulation mode, the step motor 36 is run so as to obtain the target torque ratio tr according to the target speed ratio ic while maintaining the present creep torque. Further, the mechanical feedback members control the creep torque generated by the CVT 2 to the target creep torque Tc relative to the command step number Sx to a high precision regardless of the oil temperature, as in the aforesaid first embodiment.

In this embodiment, the fuel injection amount Tp of the engine was used as the input torque Ti of the non-finite speed ratio transmission device, so the engine load is correctly reflected in the control of the creep torque, and the precision of creep torque control is improved.

Figure 17:
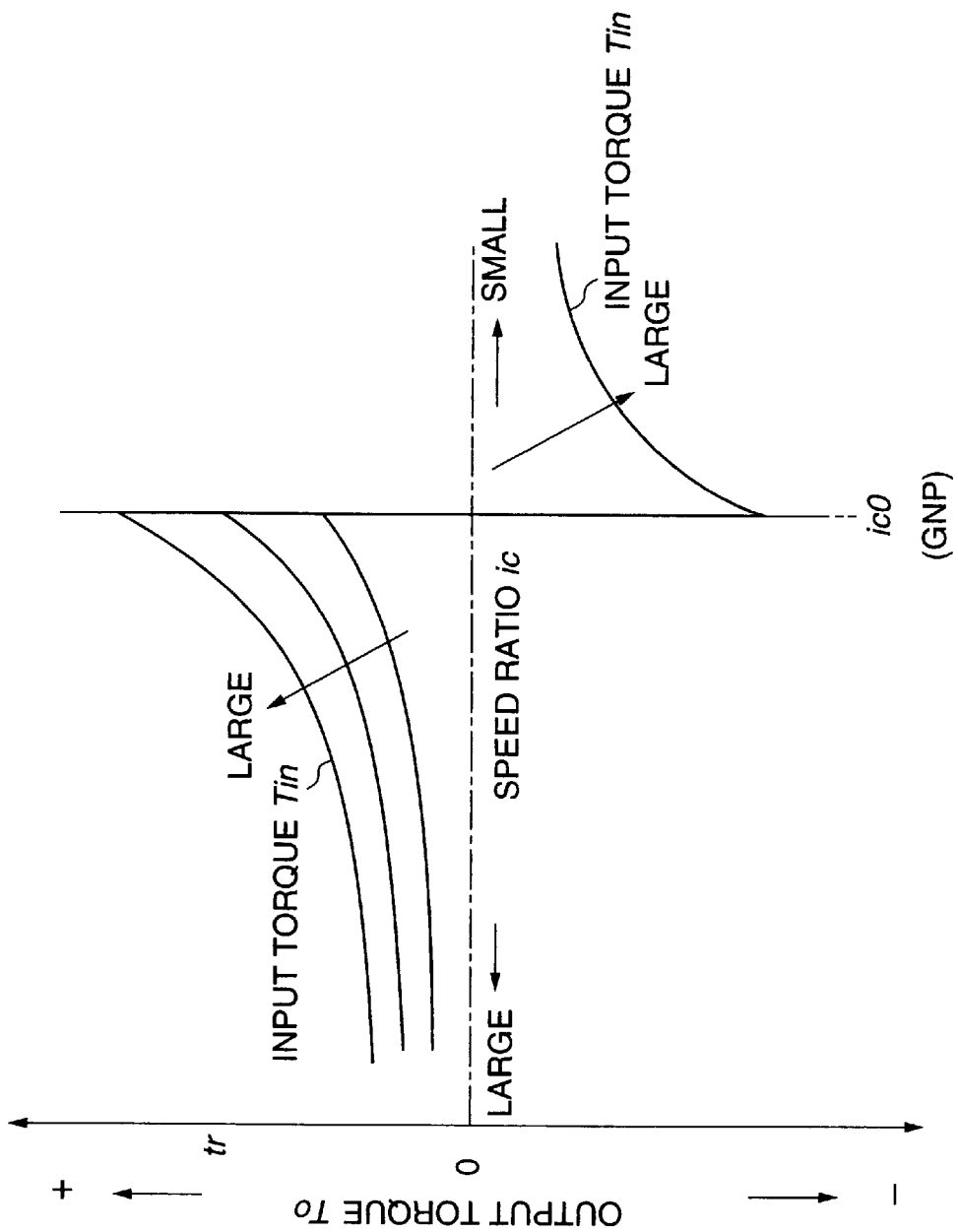
FIG. 17 is a map specifying a relation of an output torque To and speed ratio ic according to a fourth embodiment of this invention.

FIG. 17 shows a fourth embodiment of this invention.

This embodiment replaces the map of FIG. 16 of the aforesaid third embodiment by a map specifying the relation between the output torque To of the final output shaft 6 and the speed ratio ic with the input torque Ti of the input shaft 1 as a parameter. The remaining features of the construction are the same as those of the aforesaid third embodiment.

In this embodiment, the calculation of the target torque ratio tr of the step S25 of the flowchart of FIG. 15 is omitted, the target creep torque Tc which was read in the step S5 is taken as the output torque To of the final output shaft 6, and this is applied to the map of FIG. 17 together with the input torque Ti found in the step S23. According to this embodiment, the number of steps of the control routine is reduced, so the computing load of the microprocessor 80 is less.

FIG. 18 shows a fifth embodiment of this invention.

This embodiment gives an alternative to the map of FIG. 17 of the aforesaid fourth embodiment.

In the map shown in FIG. 18, the relation of the input torque Ti of the input shaft 1 and the output torque To of the final output shaft 6 is specified using the speed ratio ic as a parameter. The remaining features other than the map are the same as those of the aforesaid fourth embodiment.

In this map, the relation of the torque Ti to the output torque To at a certain speed ratio is not linear. Until the input torque Ti increases to some extent, the friction inside the CVT 2 or internal loss of the CVT 2 is large relative to the input torque Ti. Taking this friction into consideration, the relation of the input torque Ti and output torque To relative to the speed ratio ic is represented by the graph shown in the figure. By adopting this curve, the relation of the input torque Ti and output torque To can be made to effectively coincide with the real value. Therefore, control of the creep torque may be performed more precisely.

The contents of Tokugan Hei 10-356277, with a filing date of Dec. 15, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in all the above embodiments, the power circulation mode clutch 9 is disposed between the gear output shaft 3B and the carrier 5B, but it can be disposed in any position between the input shaft 1 and transmission output gear 7 of the final output shaft 6. For example, it may be provided between the ring gear 5C and final output shaft 6, between the input shaft 1 and the gear 3A of the reduction gear unit 3, or midway along the CVT output shaft 4 connected to the sun gear 5A.

In the mechanical feedback members in each embodiment, the speed change link 37 was connected to the spool 46S, step motor 36 and feedback link 38, but instead of the speed change link 37, the spool 46S may be connected directly to the step motor 36, and a sleeve which displaces relative to the spool 46S may be interposed between the spool 46S and the ports, and connected to the feedback link 38. The spool 46S and sleeve connect the speed ratio increase port 46L and speed ratio decrease port 46H to the supply port 46P and drain port 46D according to the relative displacement position of the spool 46S and sleeve.

In all the aforesaid embodiments, the target creep torque Tc was set to a value which changes with the operating state of the brake, but the target creep torque Tc may also be made to vary according to the road gradient or the running state of the vehicle.

The embodiments of this invention in which an exclusive property or privilege is claimed are defined as follows.

What is claimed is:

1. A speed ratio controller for use with a non-finite speed ratio transmission device of a vehicle, the transmission device comprising a toroidal continuously variable transmission which causes a speed ratio to vary according to a gyration angle variation of a power roller gripped between an input disk and output disk, the power roller varying the gyration angle according to a displacement of a supporting member which supports the power roller, a fixed speed ratio transmission which varies a rotation speed of the input disk with a fixed speed ratio, and a planetary gear unit which varies a rotation direction of a final output shaft according to a relation between a rotation output speed of the toroidal continuously variable transmission and a rotation output speed of the fixed speed ratio transmission, the speed ratio controller comprising:

hydraulic cylinder which displaces the supporting member according to a supplied hydraulic pressure;

a control valve which supplies a hydraulic pressure to the hydraulic cylinder according to a displacement position thereof;

an actuator which displaces the control valve according to a command signal;

a feedback member which connects the supporting member and control valve and feeds back the displacement of the supporting member to the control valve by causing the control valve to displace in the reverse direction to the displacement direction due to the actuator;

a vehicle running state sensor which detects a running state of the vehicle, a sensor which detects the speed ratio of the toroidal continuously variable transmission; and a microprocessor programmed to:
   determine whether or not the vehicle running state corresponds to a predetermined state;
   calculate a new command signal by correcting a command signal corresponding to a state in which torque is not transmitted between the input disk and output disk, by a predetermined value corresponding to a predetermined creep torque when the vehicle running state corresponds to the predetermined state; and
   output the new command signal to the actuator.

2. A speed ratio controller as defined in claim 1, wherein the vehicle running state detecting sensor comprises a sensor which detects a running speed of the vehicle and a sensor which detects a depression amount of an accelerator pedal with which the vehicle is provided, and the microprocessor is further programmed to determine that the vehicle running state corresponds to the predetermined state when the vehicle running speed is less than a predetermined value and the accelerator depression amount is zero.

3. A speed ratio controller as defined in claim 1, wherein the actuator comprises a piston joined to the supporting member, a first oil chamber pushing the piston in one direction and a second oil chamber pushing the piston in the reverse direction, wherein the control valve varies a differential pressure between the first oil chamber and second oil chamber according to a displacement position thereof, and the microprocessor is further programmed to calculate a new differential pressure based on the speed ratio of the toroidal continuously variable transmission and the predetermined value, and calculate the new command signal based on the new differential pressure.

4. A speed ratio controller as defined in claim 1, wherein the speed ratio controller further comprises a sensor which detects an input torque to the input disk, and the microprocessor is further programed to calculate a torque ratio between the input torque and an output torque of the toroidal continuously variable transmission corresponding to the predetermined creep torque, and calculate the new command signal based on the torque ratio.

5. A speed ratio controller as defined in claim 1, wherein the speed ratio controller further comprises a sensor which detects an input torque to the input disk, and the microprocessor is further programmed to determine a target speed ratio of the toroidal continuously variable transmission based on the input torque and an output torque of the toroidal continuously variable transmission corresponding to the predetermined creep torque, and calculate the new command signal based on the target speed ratio.

6. A speed ratio controller as defined in claim 5, wherein the microprocessor is provided with a map specifying a relation between the output torque of the toroidal continuously variable transmission and the speed ratio of the toroidal continuously variable transmission wherein the input torque is a parameter, and is further programmed to determine the target speed ratio by referring to the map.

7. A speed ratio controller as defined in claim 5, wherein the microprocessor is provided with a map specifying a relation between the input torque and output torque of the toroidal continuously variable transmission wherein the speed ratio of the toroidal continuously variable transmission is a parameter, and is further programmed to determine the target speed ratio by referring to the map.

8. A speed ratio controller as defined in claim 7, wherein the microprocessor is further programmed to correct the target speed ratio in the direction of in creasing speed ratio when the output torque of the toroidal continuously variable transmission is positive, and correct the target speed ratio in the direction of decreasing speed ratio when the output torque of the toroidal continuously variable transmission is negative, based on an amount equivalent to an internal frictional loss of the toroidal continuously variable transmission.

9. A speed ratio controller for use with a non-finite speed ratio transmission device of a vehicle, the transmission device comprising a toroidal continuously variable transmission which causes a speed ratio to vary according to a gyration angle variation of a power roller gripped between an input disk and output disk, the power roller varying the gyration angle according to a displacement of a supporting member which supports the power roller, a fixed speed ratio transmission which varies a rotation speed of the input disk with a fixed speed ratio, and a planetary gear unit which varies a rotation direction of a final output shaft according to a relation between a rotation output speed of the toroidal continuously variable transmission and a rotation output speed of the fixed speed ratio transmission, the speed ratio controller comprising:

a hydraulic cylinder which displaces the supporting member according to a supplied hydraulic pressure;

a control valve which supplies a hydraulic pressure to the hydraulic cylinder according to a displacement position thereof;

an actuator which displaces the control valve according to a command signal;

a feedback member which connects the supporting member and control valve and feeds back the displacement of the supporting member to the control valve by causing the control valve to displace in the reverse direction to the displacement direction due to the actuator;

means for detecting a running state of the vehicle, means for detecting the speed ratio of the toroidal continuously variable transmission;

means for determining whether or not the vehicle running state corresponds to a predetermined state;

means for calculating a new command signal by correcting a command signal corresponding to a state in which torque is not transmitted between the input disk and output disk, by a predetermined value corresponding to a predetermined creep torque when the vehicle running state corresponds to the predetermined state; and means for outputting the new command signal to the actuator.

10. A method for controlling a speed ratio of a non-finite speed ratio transmission device of a vehicle, the transmission device comprising a toroidal continuously variable transmission which causes a speed ratio to vary according to a gyration angle variation of a power roller gripped between an input disk and output disk, the power roller varying the gyration angle according to a displacement of a supporting member which supports the power roller, a hydraulic cylinder which displaces the supporting member according to a supplied hydraulic pressure, a control valve which supplies a hydraulic pressure to the hydraulic cylinder according to a displacement position thereof, an actuator which displaces the control valve according to a command signal, a feedback member which connects the supporting member and control valve and feeds back the displacement of the supporting member to the control valve by causing the control valve to displace in the reverse direction to the displacement direction due to the actuator, a fixed speed ratio transmission which varies a rotation speed of the input disk with a fixed speed ratio, and a planetary gear unit which varies a rotation direction of a final output shaft according to a relation between a rotation output speed of the toroidal continuously variable transmission and a rotation output speed of the fixed speed ratio transmission, the method comprising:

detecting a running state of the vehicle, detecting the speed ratio of the toroidal continuously variable transmission;

determining whether or not the vehicle running state corresponds to a predetermined state;

calculating a new command signal by correcting a command signal corresponding to a state in which torque is not transmitted between the input disk and output disk, by a predetermined value corresponding to a predetermined creep torque when the vehicle running state corresponds to the predetermined state; and outputting the new command signal to the actuator.

* * * * *